United States Patent
Onuki et al.

(10) Patent No.: US 6,201,944 B1
(45) Date of Patent: Mar. 13, 2001

(54) TANDEM-TYPE IMAGE FORMING APPARATUS OPERATING IN COLOR MODE AND MONOCHROME MODE

(75) Inventors: Tetsuya Onuki, Toyokawa; Hirokazu Matsuo, Toyohashi; Seiichi Munemori, Toyokawa, all of (JP)

(73) Assignee: Minolta Co., Ltd., Osaka (JP)

( * ) Notice: Subject to any disclaimer, the term of this patent is extended or adjusted under 35 U.S.C. 154(b) by 0 days.

(21) Appl. No.: 09/131,863

(22) Filed: Aug. 10, 1998

(30) Foreign Application Priority Data

Aug. 12, 1997 (JP) .................................................. 9-217840
Aug. 29, 1997 (JP) .................................................. 9-235134

(51) Int. Cl.$^7$ .................................................. G03G 15/01
(52) U.S. Cl. ..................... 399/299; 347/117; 399/179; 399/303; 399/317
(58) Field of Search ................................... 347/115, 139, 347/153, 117; 399/303, 299, 306, 312, 178, 179, 51, 317

(56) References Cited

U.S. PATENT DOCUMENTS

| | | | |
|---|---|---|---|
| 5,282,012 | * 1/1994 | Terada et al. | 399/299 X |
| 5,765,082 | * 6/1998 | Numazu et al. | 399/299 |
| 5,893,017 | * 4/1999 | Yamamoto | 399/299 |
| 6,029,023 | * 2/2000 | Munemori et al. | 399/299 X |
| 6,061,542 | * 5/2000 | Minami et al. | 399/299 |

FOREIGN PATENT DOCUMENTS

| | | |
|---|---|---|
| 3-288173 | 12/1991 | (JP) . |
| 6-102776 | 4/1994 | (JP) . |
| 6-258914 | 9/1994 | (JP) . |
| 8-181870 | * 7/1996 | (JP) . |
| 9-102878 | * 4/1997 | (JP) . |
| 9-233320 | * 9/1997 | (JP) . |

* cited by examiner

*Primary Examiner*—Susan S. Y. Lee
(74) *Attorney, Agent, or Firm*—Morrison & Foerster LLP

(57) ABSTRACT

The recording sheet supporting surface of the transport belt comes in contact with the photosensitive drums for cyan, magenta, yellow, and black in the color copy mode, and is separated from the photosensitive drums aside from the photosensitive drum used for forming a black image in the monochrome copy mode with the image forming units for cyan, magenta, and yellow not being activated. With this separating operation, the distance on the transportation path of the recording sheet measured from the synchronizing roller to the transfer position of the photosensitive drum used for forming a black image in the monochrome copy mode is longer than in the color copy mode. Thus, the start time of scanning the surface of the photosensitive drum used for forming the black image is delayed in the monochrome mode according to the difference in distances between the color and monochrome modes.

24 Claims, 23 Drawing Sheets

TANDEM-TYPE IMAGE FORMING APPARATUS OPERATING IN COLOR MODE AND MONOCHROME MODE

This application is based on applications No. 9-217840 and No. 9-235134 filed in Japan, the contents of which are hereby incorporated by reference.

BACKGROUND OF THE INVENTION

(1) Field of the Invention

The present invention relates to a tandem-type image forming apparatus which has image holding components and is able to switch between a full-color copy mode using all of the image holding components to form a full-color image and a monochrome copy mode using only one of the image holding components to form a single-color image.

(2) Related Art

With the widespread use of personal computers in recent years, color documents have become increasingly common in organizations, such as offices. As a result, there are increasingly demands for image forming apparatuses that can perform color printing at high speed.

Tandem-type color copying machines have received much attention as examples of this type of image forming apparatus. In a tandem-type color copying machine, cyan, magenta, yellow, and black toner images are sequentially transferred onto a recording sheet by image forming units. These image forming units correspond to the four colors, are set along a transportation path of a recording sheet, and each include a photosensitive drum and a transfer unit as their main components. The recording sheet is transported by a transport belt that runs over a plurality of rollers. In general, the photosensitive drum used for forming a black image is set at a rearmost position on the transportation path of the recording sheet for better reproduction of black parts of the color image.

When performing operations aside from full-color image formation, such as when forming a black image using this type of image forming apparatus, toner images are not formed on the photosensitive drums for cyan, magenta, and yellow, and a toner image is formed only on the photosensitive drum used for the black image formation.

However, when only one photosensitive drum is used, the recording sheet still comes into contact with the other three photosensitive drums during transportation. For this reason, the three photosensitive drums which are not used for the image formation still need to be rotated. This results in needless wear and tear on the photosensitive drums and cleaning blades that are in contact with the photosensitive drums.

To address this problem, Japanese Laid-Open Patent Applications No. 3-288173, No. 6-258914, and No. 6-102776 teach examples of a color image forming apparatus. These color image forming apparatuses have the transport belt contact all of the photosensitive drums when forming a full-color image (referred to as the "color copy mode" hereinafter), and rotates the whole transport belt about the rotational axis of the photosensitive drum of the image forming unit used for forming a black image when forming a black image (referred to as the "monochrome copy mode" hereinafter) so that the transport belt does not come into contact with the photosensitive drums for cyan, magenta, and yellow which are not used for black image formation.

Accordingly, the photosensitive drums of cyan, magenta, and yellow do not need to be rotated when a black image is formed. This prevents needless wear and tear on these photosensitive drums.

With these conventional image forming apparatuses, the transport belt is separated from the photosensitive drums and shifted downward in the monochrome copy mode. This causes variations in the position at which the recording sheet is held on the transport belt (that is, the position from which the transport belt starts transporting the recording sheet) and variations in the transportation path length. As a result, time taken for the recording sheet to reach the photosensitive drum of the image forming unit used for forming a black image varies, so that an image may be transferred onto the recording sheet at an incorrect position.

In addition, when using an image forming apparatus which selectively operable in the color copy mode and the monochrome copy mode, a user specifies one copy mode using an operation panel, with the transport belt being separated from or pressed against the photosensitive drums before a series of image formations are executed.

For this reason, when performing a copying job for a mixture of color and monochrome documents using an image forming apparatus with an automatic document feeder (ADF), the user sets the color copy mode and presses a copy start key. Here, regardless whether a document is color or monochrome, image formation is conventionally performed for all of the documents in the same copy mode, with the photosensitive drums and the transport belt being in contact with each other.

Regarding business documents in particular, the ratio of monochrome documents in a copying job is considerably high. However, if copying jobs that include a relatively low proportion of color images still need to be performed in the color copy mode, this means that the monochrome mode where needless wear and tear on the unused photosensitive drums is prevented cannot be effectively used. This poses a major constraint to the operational effect of providing such monochrome copy mode.

This problem also occurs when using a printer as the image forming apparatus to successively print out a document including both color and monochrome pages.

SUMMARY OF THE INVENTION

The first object of the present invention is to provide a tandem-type image forming apparatus which can prevent needless wear and tear on the components, such as the photosensitive drums, with no image displacement on the recording sheet.

The second object of the present invention is to provide a tandem-type image forming apparatus which can prevent needless wear and tear on the components, such as the photosensitive drums, even during successive copy operations by automatically switching the current copy mode in accordance with whether a document is color or monochrome.

The first object of the present invention can be achieved by claim 1.

With this structure, when the recording sheet supporting surface of the transporting unit is separated from each image holding component of the second image forming assembly, the exposure start timing for the image holding component of the first image forming assembly by the exposure unit is changed. As a result, the image is always transferred onto the recording sheet at the correct position.

The first object of the present invention can be also achieved by claim 11.

With this structure, when using the image forming apparatus which separates the transport belt from the image holding components aside from one image holding component in the monochrome copy mode, the time taken until the start of scanning of the surface of the one image holding component, measured from the supplying of the recording sheet to the transport belt, is set differently in the monochrome copy mode and the color copy mode. As a result, the image is always transferred onto the recording sheet at the correct position.

The second object of the present invention can be achieved by claim 17.

With this structure, when documents include both color and monochrome documents, image formations are successively performed with the copy mode being automatically switched for each document when necessary. Thus, even when successive copy operations for documents include both color and monochrome documents are performed, image formation is not always performed in the color copy mode for all documents as in a conventional image forming apparatus. When a document is monochrome, the mode is set at the monochrome copy mode and the image holding components which are not used for forming an image are not activated. As a result, wear and tear on the components around these image holding components can be prevented.

BRIEF DESCRIPTION OF THE DRAWINGS

These and other objects, advantages and features of the invention will become apparent from the following description thereof taken in conjunction with the accompanying drawings which illustrate a specific embodiment of the invention. In the drawings.

DESCRIPTION OF PREFERRED EMBODIMENTS

The following is a description of embodiments of the image forming apparatus of the present invention. In these embodiments, a tandem-type full-color copying machine (referred to as the "copier" hereinafter) is used as an example of such an image forming apparatus.

First Embodiment

Figure 1:
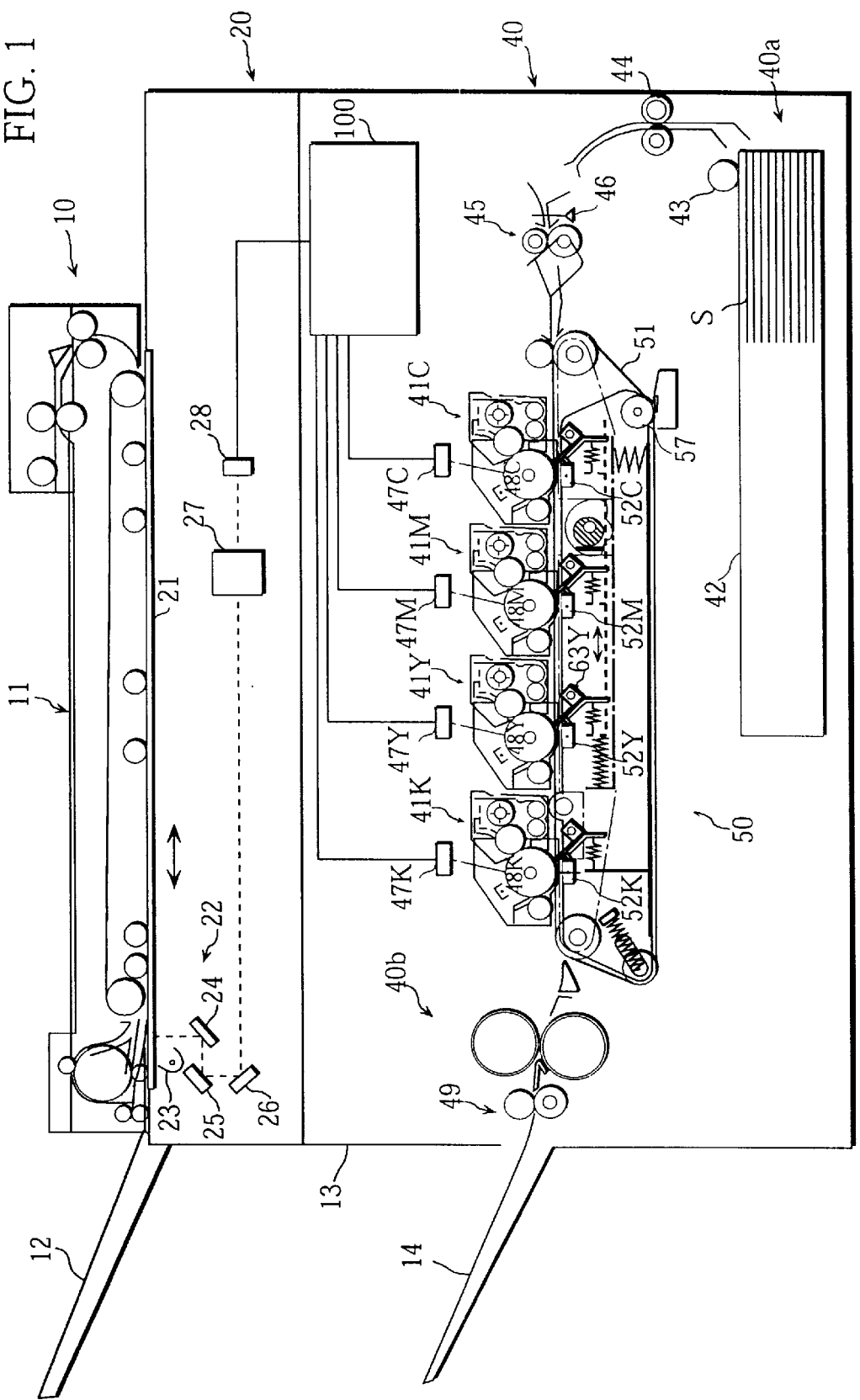
FIG. 1 shows the overall construction of a tandem-type full-color copying machine of the first embodiment of the present invention.

FIG. 1 is a front view of the copier of the first embodiment.

As shown in FIG. 1, this copier is composed of an automatic document transport device 10, an image read unit 20, and a print unit 40.

The automatic document transport device 10 is a well known device which automatically transports documents set on a document feeding tray 11 to a platen glass 21 of the image read unit 20 one at a time, and which discharges each document onto a document discharge tray 12 after the document image has been read.

The image read unit 20 is provided with a scanner 22 under the platen glass 21 that moves laterally, as shown by the arrow in FIG. 1. Light from an exposure lamp 23 of the scanner 22 is reflected by the document, and is redirected by mirrors 24–26 before passing through the converging lens 27 and into a CCD color image sensor 28. The CCD color image sensor 28 converts the reflected light into image signals of red (R), green (G), and blue (B), and outputs the image signals to a control unit 100.

The print unit 40 can be roughly divided into a paper supplying device 40a, a transfer unit 50, image forming units 41C to 41K, and a fixing unit 40b.

A paper supplying cassette 42 of the paper supplying device 40a is set in a lower space of an enclosure 13 and is slidable outward parallel to the viewing direction of FIG. 1. A recording sheet S supplied from the paper supplying cassette 42 by a paper supplying roller 43 is transported upward by a pair of intermediate rollers 44. The recording sheet S then activates a timing sensor 46 positioned immediately before a pair of synchronizing rollers 45 and stops with its leading edge touching the pair of synchronizing rollers 45 that are currently at rest. After standing by in this way, the recording sheet S is transported toward the transfer unit 50 by the pair of transfer rollers 45 that are rotated in synchronization with the image forming operations of the image forming units 41C to 41K. It should be noted here that the pair of synchronizing rollers 45 is driven by a motor (not illustrated), and that the rotation is started and stopped in accordance with ON/OFF of a timing clutch (not illustrated) which is set between the pair of synchronizing rollers 45 and the motor.

The recording sheet S is hereafter transported by a transport belt 51 of the transfer unit 50.

The image forming units 41C to 41K are placed in line along the transport belt 51. The control unit 100 performs necessary image processing on the R, G, and B electric signals inputted into the control unit 100 and converts the signals into cyan (C), magenta (M), yellow (Y), and black (K) color elements. Laser diodes (not illustrated) of exposure units 47C to 47K set above the image forming units 41C to 41K are driven to perform light modulation based on the color signals. The light-modulated laser beams are respectively brought to the corresponding image forming units 41C to 41K. Each of the image forming units 41C to 41K is provided with a corresponding one of photosensitive drums 48C to 48K as a main component, a transfer charger, a developing unit, and a cleaning blade. The image forming units 41C to 41K are constructed to form images according to what is called an electrostatic copying method. More specifically, the image forming units 41C to 41K expose the surfaces of the photosensitive drums 48C to 48K by the light-modulated laser beams and form electrostatic latent images, which are then developed by the developing units using toner. Note that C, M, Y, and K toner corresponding to the light-modulated colors of the exposure units 47C to 47K is supplied to the corresponding photosensitive drums 48C to 48K by the developing units of the image forming units 41C to 41K.

The toner images formed on the photosensitive drums 48C to 48K are sequentially transferred onto the recording sheet S transported by the transport belt 51 at respective transfer positions located under the photosensitive drums 48C to 48K using electrostatic power of transfer chargers 52C to 52K which are set on the underside of the transport belt 51. The recording sheet S on which a toner image is transferred is transported by the transport belt 51 to the fixing unit 40*b*, where toner particles on the surface of the recording sheet S are fused and fixed in place. The recording sheet S is then discharged onto a tray 14 via a pair of discharge rollers 49.

Next, the construction of the transfer unit 50 is described, with reference to FIG. 2 to FIG. 5.

Figure 2:
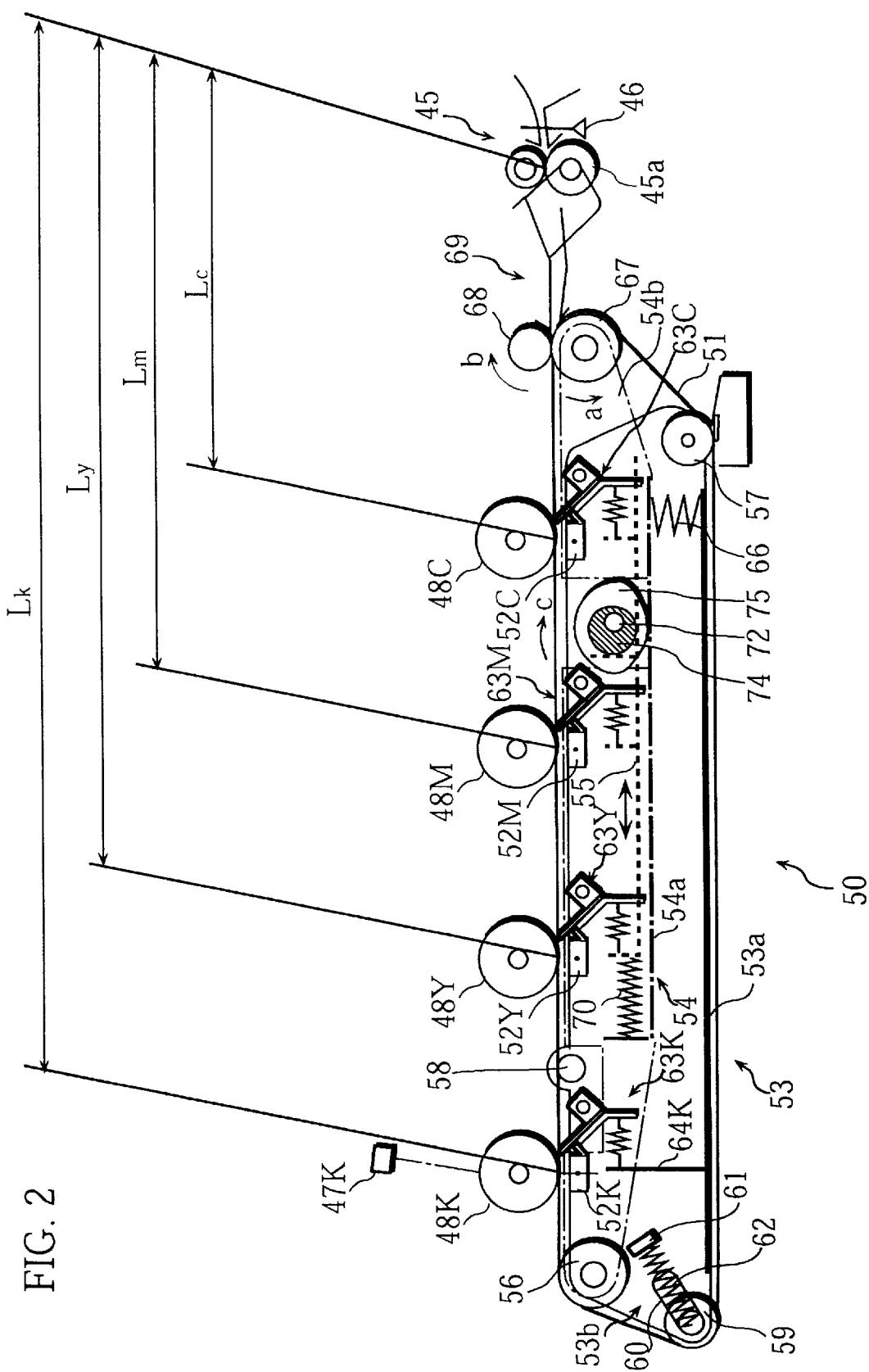
FIG. 2 is an enlarged view of the construction of a transfer unit of the full-color copying machine in the color copy mode.

FIG. 2 shows a front view of the transfer unit 50. The transfer unit 50 is composed of a main frame 53, a shift frame 54, and a slide frame 55. In FIG. 2, the main frame 53 is indicated by a solid line, the shift frame 54 by a dot-dash line, and the slide frame 55 by a dotted line.

The main frame 53 is formed of a base plate 53*a* that has a predetermined width (parallel to the viewing direction in FIG. 2) and side plates 53*b* that are provided on the front side and the rear side (as the copier is viewed in FIG. 2) of the base plate 53*a*. Rotational axes of slave rollers 56 and 57, an assistance roller 58, and a tension roller 59 are set to freely rotate at the positions on the side plates 53*b* shown in FIG. 2 via respective bearings (not illustrated). The bearings of the tension roller 59 are held in rounded rectangular holes 60 which longitudinally extend upward and to the right, with the axis of the tension roller 59 passing through the holes 60. The bearings are held by the tension of compression springs 62 which are set between the bearings and spring mounting elements 61 that are set on the side plate 53*b* and protrude outward. The tension roller 59 keeps the tension of the transport belt 51 constant. The transfer charger 52K is set directly under the photosensitive drum 48K, with both ends of the transfer charger 52K being held by the side plates 53*b*. A transfer backup 63K is set on the right (as the copier is viewed in FIG. 2) of the transfer charger 52K.

Figure 3:
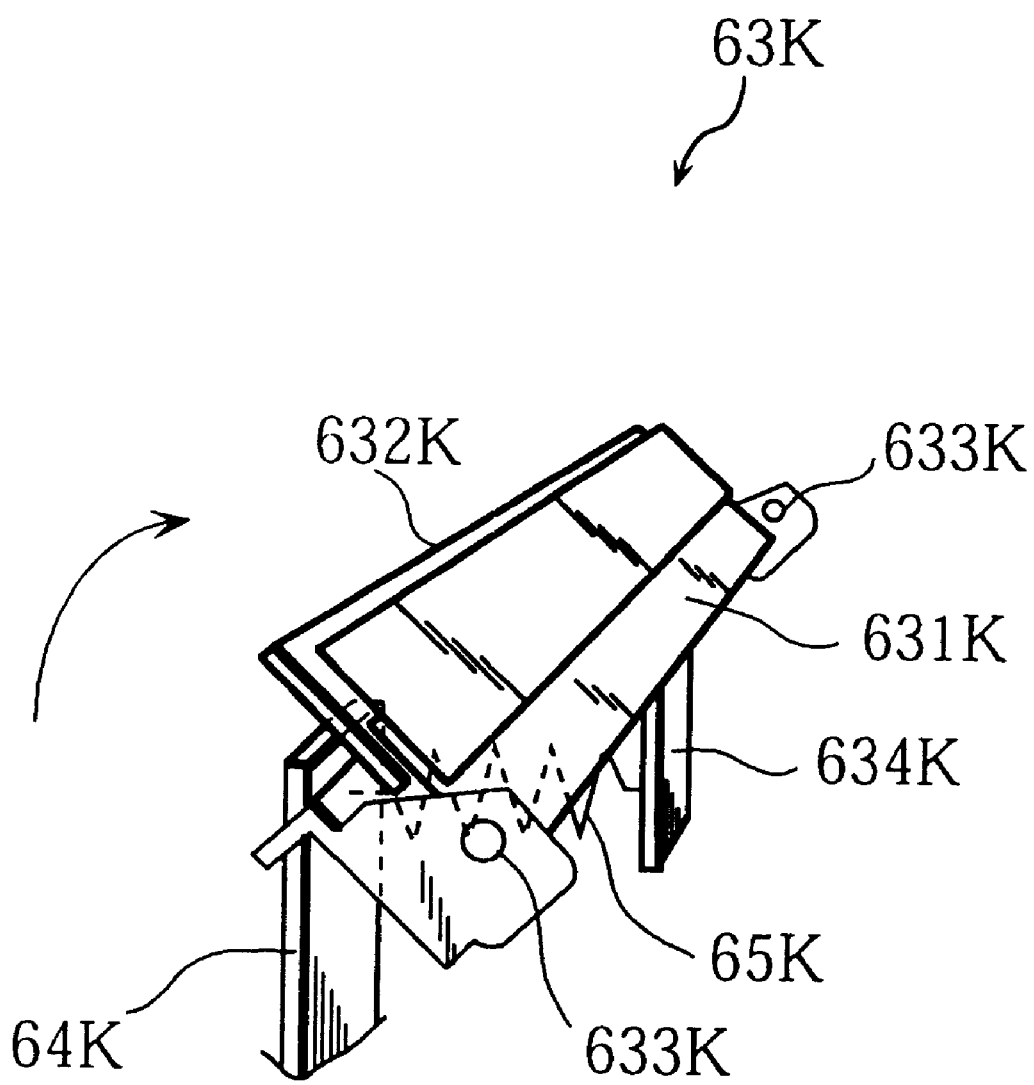
FIG. 3 is a perspective view of a transfer backup of the transfer unit.

As shown in FIG. 3, the transfer backup 63K is composed of a backup blade supporting member 631K and a backup blade 632K which is made up of polyethylene terephthalate (PET). This transfer backup 63K is mounted onto the main frame 53 by inserting backup mounting shafts (not illustrated) that protrude inward from both side plates 53*b* into mounting holes 633K provided at both ends of the backup plate supporting member 631K. A tensile spring 65K is mounted between a spring mounting component 64K set on the main frame 53 and a spring mounting unit 634K of the backup blade supporting member 631K. A rotational force is applied to the transfer backup 63K by the tension of the tensile spring 65K in the direction indicated by the arrow in FIG. 3, with a backup mounting axis (not illustrated) as the center of rotation. As a result, the edge of the backup blade 632K presses the transport belt 51 (shown in FIG. 2) from underneath. The transfer backup 63K presses the transport belt 51 from underneath, so that a contact area of the transport belt 51 and the photosensitive drum 48K is enlarged. Consequently, an excellent transfer of a toner image is performed by keeping the recording sheet S and the photosensitive drum 48K in absolute contact with one another as the recording sheet S enters the electrostatic transfer area.

In FIG. 2, the shift frame 54 is formed of an L-shaped base plate 54*a* and side plates 54*b* on the front side and the rear side (as the copier is viewed in FIG. 2) of the base plate 54*a*. The shift frame 54 is set between the side plates 53*b* of the main frame 53, with the left ends (as viewed in FIG. 2) of the side plates 54*b* being mounted on the rotational axis of the slave roller 56 via bearings (not illustrated), so that the shift frame 54 may rotate. A compression spring 66 is set between the lower surface of the base plate 54*a* of the shift frame 54 and the upper surface of the base plate 53*a* of the main frame 53. A drive roller 67 is set on the right ends (as viewed in FIG. 2) of the side plates 54*b* of the shift frame 54, with its rotational axis being held via bearings (not illustrated). An output shaft of a motor (not illustrated) fixed to one of the side plates 54*b* is coupled to the rotational axis of the drive roller 67, so that the drive roller 67 rotates in the direction indicated by the arrow a in FIG. 2. A charging roller 68 for pressing the surface of the drive roller 67 rotates in the direction indicated by the arrow b in FIG. 2 in synchronization with the rotation of the drive roller 67, with the transport belt 51 passing between these rollers. In addition, the charging roller 68 serves as a charger which charges the recording sheet S fed by the pair of synchronizing rollers 45, so that the recording sheet S is securely attracted to the transport belt 51. It should be noted here that a separating charger (not illustrated) is set on the left (as viewed in FIG. 2) of the photosensitive drum 48K. By means of this separating charger, the recording sheet S with the transferred toner images is separated from the transport belt 51.

A shift guide 69 is suspended between the pair of synchronizing rollers 45 and the drive roller 67. Via respective mounting components (not illustrated), one end of the shift guide 69 is mounted on the rotational axis of the lower roller 45a of the pair of synchronizing rollers 45 to freely rotate and another end of the shift guide 69 is held against the upper surface of the rotational axis of the drive roller 67 to freely slide. As such, the shift guide 69 will be shifted in accordance with the vertical movement of the drive roller 67 that occurs when the shift frame 54 is shifted. Consequently, the recording sheet S fed by the pair of synchronizing rollers 45 is reliably guided to the charging roller 68 via the shift guide 69.

The transfer chargers 52C to 52Y, which are held between the side plates 54b of the shift frame 54, are set directly under the corresponding photosensitive drums 48C to 48Y. The transfer backups 63C to 63Y are respectively mounted on the right (as viewed in FIG. 2) of the transfer chargers 52C to 52Y. The mounting states and constructions of the transfer chargers 52C to 52Y and the transfer backups 63C to 63Y are the same as those of the transfer charger 52K and the transfer backup 63K, and so will not be explained.

Figure 4:
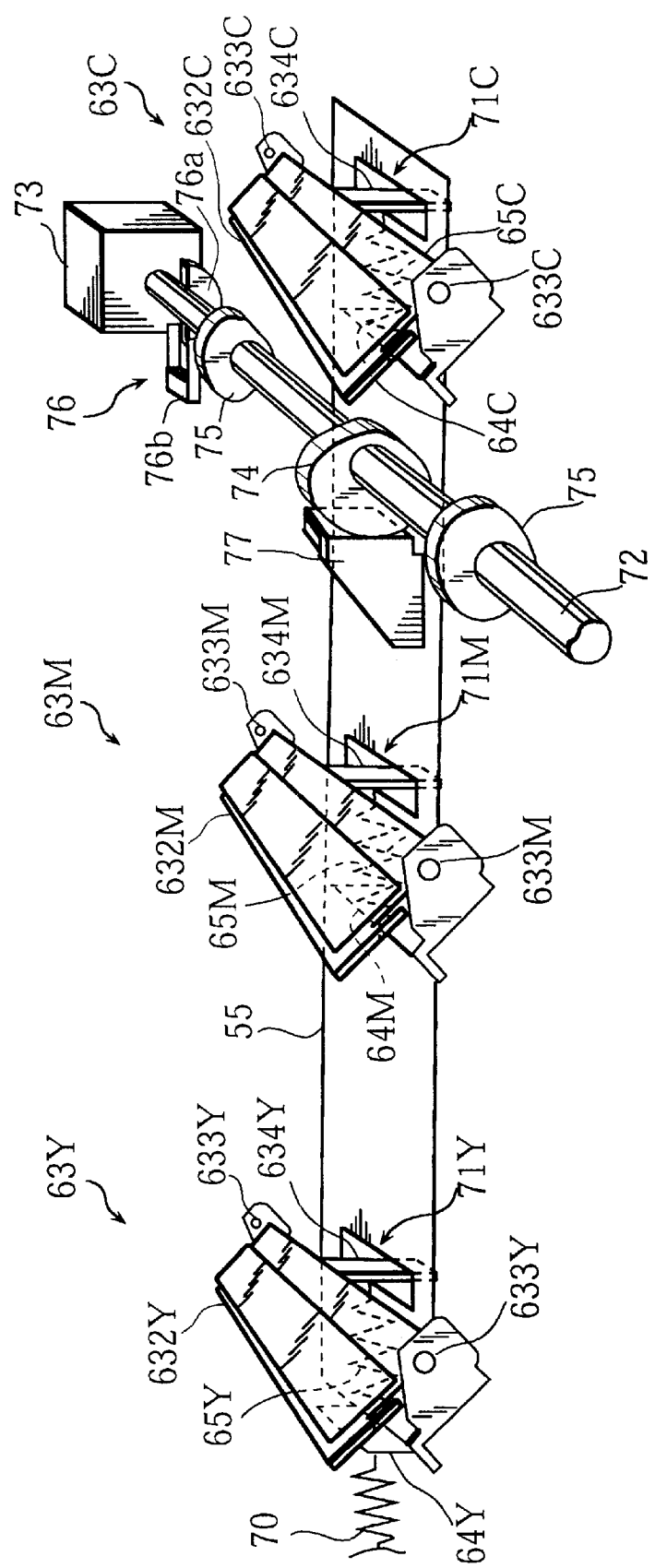
FIG. 4 is a perspective view of part of the transfer unit.

The slide frame 55 is set above the base plate 54a via a guiding component (not illustrated) between the side plates 54b of the shift frame 54, and is mounted to freely slide in a longitudinal direction. A compression spring 70 is set between the left side (as viewed in FIG. 2) of the slide frame 55 and the left side (as viewed in FIG. 2) of the base plate 54a of the shift frame 54. As shown in FIG. 4, spring mounting components 64C to 64Y corresponding to the transfer backups 63C to 63Y are provided for the slide frame 55. Tensile springs 65C to 65Y are mounted between the spring mounting components 64C to 64Y and corresponding spring mounting units 634C to 634Y of the transfer backups 63C to 63Y. The slide frame 55 is further provided with rectangular holes 71C to 71Y into which the lower parts of the spring mounting units 634C to 634K of the transfer backups 63C to 63Y are inserted. When the slide frame 55 slides to the right (as the copier is viewed in FIG. 2), the left side walls of the rectangle holes 71C to 71Y press the spring mounting units 634C to 634Y to the right, and as a result, the transfer backups 63C to 63Y turn counterclockwise. When the spring mounting units 634C to 634Y and the walls of the rectangle holes 71C to 71Y are not in contact as shown in FIG. 4, the spring mounting units 634C to 634Y are pulled toward the left by the tension of the tensile springs 65C to 65Y, and accordingly, the transfer backups 63C to 63Y turn clockwise to touch the transport belt 51.

A cam shaft 72 is mounted on the side plates 53b of the main frame 53 shown in FIG. 2 via bearings (not illustrated) to freely rotate, with one end of the cam shaft 72 being coupled to an output shaft of a cam driving motor 73 which is, for example, a DC (Direct Current) motor. The cam shaft 72 is provided with a slide cam 74 for sliding the slide frame 55, a pair of shift cams 75 for shifting the shift frame 54, and a detection plate 76a for detecting a rotation position of the cams.

The slide cam 74 always contacts with a cam follower 77 set on the slide frame 55 which is pushed toward the right by the tension of the compressed spring 70. By rotating the slide cam 74, the slide frame 55 can be slid sideways by a distance equal to the difference between the widest and the narrowest parts of the slide cam 74.

The shift cams 75 are always in contact with the upper surface of the base plate 54a of the shift frame 54 which is pushed upward by the tension of the compressed spring 66 as shown in FIG. 2. By rotating the shift cams 75, the shift frame 54 can be shifted upward and downward by a distance equal to the difference between the widest and the narrowest parts of the shift cams 75.

The detection plate 76a is made up of a semicircular plate. A photo sensor 76b is composed of a light-emitting element and a light-detecting element which face each other and are set on opposite sides of the detection plate 76a. The detection plate 76a and the photo sensor 76b comprise a rotation position detection unit 76. If the detection plate 76a is located between the light-emitting element and the light-detecting element, the photo sensor 76b outputs an OFF signal, or if not, the photo sensor 76b outputs an ON signal. This is to say, every time the detection plate 76a rotates 180 degrees, the signal outputted from the photo sensor 76b changes from ON to OFF, or alternatively, from OFF to ON. In accordance with this detection result, the rotation position of the cam shaft 72 provided with the detection plate 76a can be controlled for every 180-degree rotation. By means of the detection plate 76a, an output signal of the photo sensor 76b changes from OFF to ON when the widest parts of the shift cams 75 are located at the lowermost position, and changes from ON to OFF when the narrowest parts of the shift cams 75 are located at the lowermost position.

The rotation control of the cam driving motor 73 which rotates the cam shaft 72 provided with these cams is performed by the control unit 100. The control unit 100 detects the rotation positions of the shift cams 75 using the photo sensor 76b and activates/stops the cam driving motor 73 to have the shift frame 54 stop at the uppermost position or the lowermost position.

As shown in FIG. 4, the widest parts of the shift cams 75 and the widest part of the slide cam 74 are out of phase with each other by 90 degrees. As such, when the widest parts of the shift cams 75 are located at the uppermost positions (i.e., the narrowest parts are located at the lowermost positions) and the shift frame 54 is at the uppermost position, the widest part of the slide cam 74 is located at the left (i.e., the narrowest part is located at the right), making the slide frame 55 slide to its leftmost position. On the other hand, when the widest parts of the shift cams 75 are located at the lowermost positions and the shift frame 54 is shifted downward to the lowermost position, the widest part of the slide cam 74 is located at the right (i.e., the narrowest part is located at the left), making the slide frame 55 slide to its rightmost position.

Figure 6:
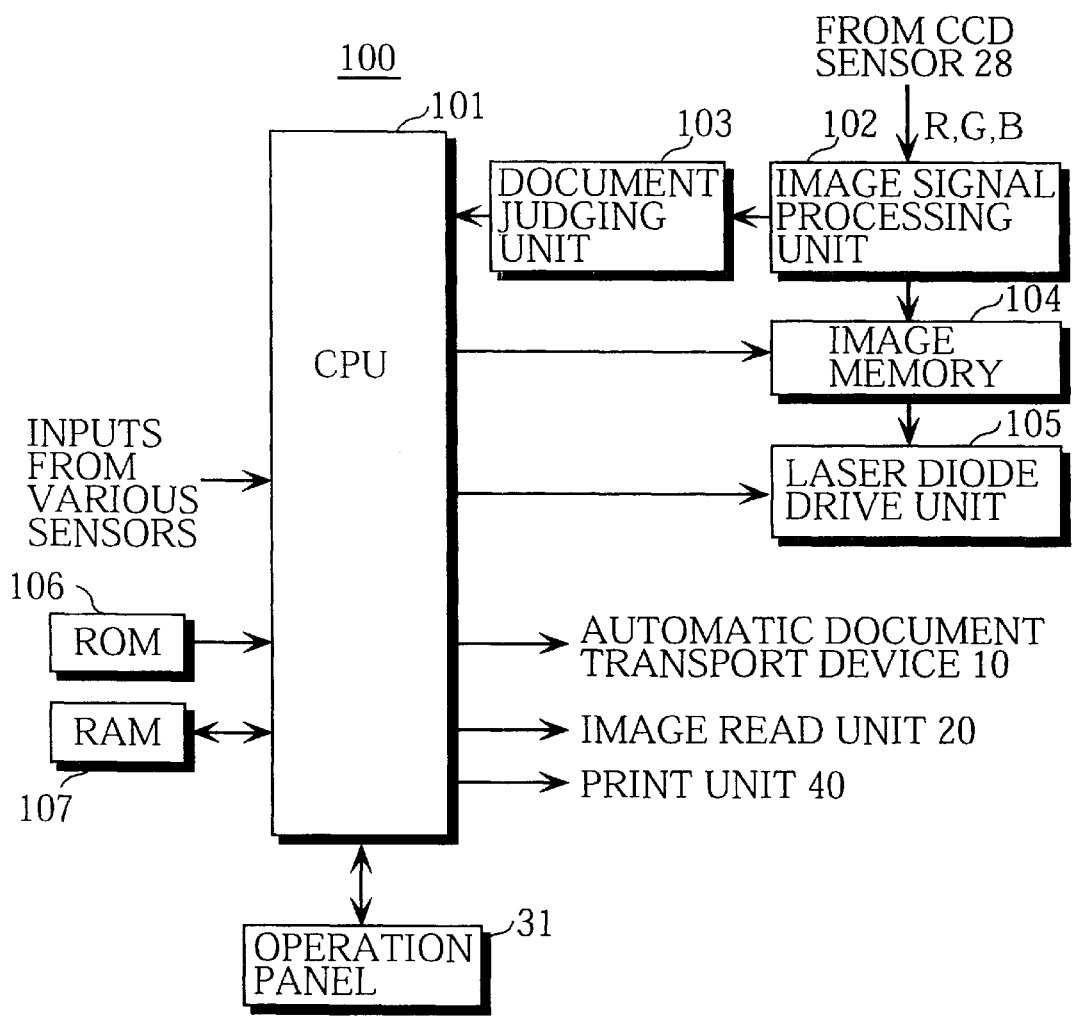
FIG. 6 is a block diagram showing the construction of a control unit of the full-color copying machine.

An operation panel 31 shown in FIG. 6 is provided on an optimum position on the top of the copier. The operation panel 31 is composed of a copy start key for indicating a start of copying, a numeric keypad for setting the number of copies, and various input keys including a manual mode switch key for selecting the monochrome copy mode or the color copy mode and an auto mode switch key for automatically selecting the monochrome copy mode or the color copy mode depending on whether a read document is a color document or not. The operation panel 31 also includes a display unit for displaying a content set using the above keys. Here, in the monochrome copy mode, the image formation is performed in a state where only the photosensitive drum 48K used for a black image formation is used. Meanwhile, in the color copy mode, the image formation is performed in a state where the four photosensitive drums 48C to 48K are all operative.

Next, the overall operation of the transfer unit 50 is explained for the case when the current mode is changed between the monochrome copy mode and the color copy mode.

In FIG. 2, the transfer unit 50 is in the color copy mode. More specifically, the shift frame 54 is located at the uppermost position, the transport belt 51 is in contact with the four photosensitive drums 48C to 48K, the transfer backups 63C to 63K press the corresponding photosensitive drums 48C to 48K via the transport belt 51, and an optimum nip width is ensured between the transport belt 51 and the photosensitive drums 48C to 48K. The nip width referred to here means the length of the circumference of the photosensitive drum which is in contact with the recording sheet.

Figure 5:
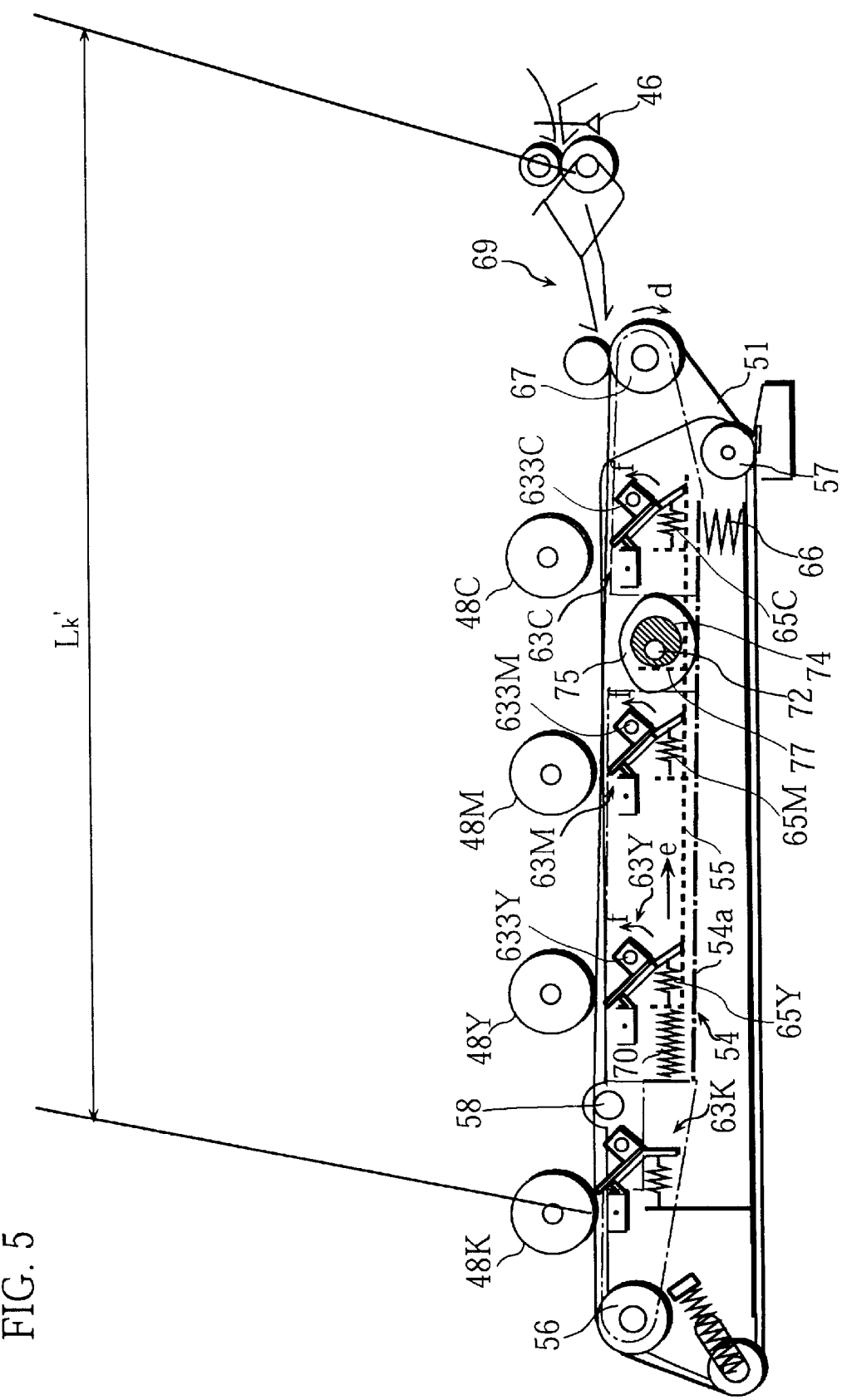
FIG. 5 is an enlarged view of the construction of the transfer unit of the full-color copying machine in the monochrome mode.

In order to change from the color copy mode to the monochrome copy mode, the cam driving motor 73 shown in FIG. 4 is activated. Once the cam shaft 72 is judged from the detection result given by the photo sensor 76b shown in FIG. 4 to have rotated by 180 degrees in the direction indicated by the arrow c, the shift cams 75 will be pushing down the base plate 54a of the shift frame 54 against the tension of the compressed spring 66. As a result, the shift frame 54 will have been shifted in the direction indicated by the arrow d, about the rotational axis of the slave roller 56, and so will be located at the lowermost position, as shown in FIG. 5.

Together with this movement, the section of the transport belt 51 between the assistance roller 58 and the drive roller 67 will have been shifted downward, as will have the section between the drive roller 67 and the slave roller 57. Thus, the transport belt 51 is separated from the photosensitive drums 48C to 48Y, leaving a sufficient space for the recording sheet S transported by the transport belt 51 to pass the photosensitive drums 48C to 48K without coming into contact with them. Meanwhile, an assistance roller 58 is provided for the photosensitive drum 48K and the transport belt 51, so that aside from the case where the recording sheet S needs to pass by the black image forming unit 41K without image formation being performed, the transport belt 51 can be kept in contact with the photosensitive drum 48K regardless of the position of the shift frame 54, i.e., regardless of whether monochrome copy mode or color copy mode is presently operational. In addition, an optimum nip width is secured between the transport belt 51 and the photosensitive drum 48K by the transfer backup 63K.

When the cam shaft 72 is rotated, the slide cam 74 also rotates and the part of the slide cam 74 which is in contact with the cam follower 77 will change from the widest part to the narrowest part. Consequently, the slide frame 55 slides to the right (that is, in the direction of the arrow e) in accordance with the tension of the compressed spring 70 and the left walls of the rectangle holes 71C to 71Y provided for the slide frame 55 push the spring mounting units 634C to 634Y of the transfer backups 63C to 63Y to the right. As a result, the transfer backups 63C to 63Y rotate about the mounting holes 633C to 633Y in the direction indicated by the arrow f, and the backup blades 632C to 632Y are separated from the transport belt 51. Accordingly, needless contact of the backup blades 632C to 632Y with the transport belt 51 is eliminated, thereby preventing needless wear and tear.

In accordance with the downward shift of the shift frame 54, the drive roller 67 is shifted, and together with this, the shift guide 69 is also shifted.

When the current mode is changed from the monochrome copy mode to the color copy mode, the cam shaft 72 further rotates by 180 degrees. This is to say, all the components move according to the reverse of the operation described above, and the state of the transfer unit 50 changes from the state in FIG. 5 to the state in FIG. 2.

FIG. 6 is a block diagram showing the construction of the control unit 100 provided in the copier. As shown in FIG. 6, the control unit 100 is composed of a CPU 101 as a central component, an image signal processing unit 102, a document judging unit 103, an image memory 104 for storing image data read by the read unit 20, a laser diode driving unit 105, a ROM 106 for storing programs required for the various control operations, and a RAM 107 serving as a work area for executing programs.

The image signal processing unit 102 performs shading correction (described later in this specification) on R, G, and B image data transmitted from the CCD color image sensor 28 of the image read unit 20 and transmits the processed image data for each page to the document judging unit 103. Simultaneously, the image signal processing unit 102 converts the image data into image data for each of the reproduction colors C, M, Y, and K that enables an optimum reproduced image to be obtained and transmits the image data to the image memory 104.

The document judging unit 103 judges whether each document is color or monochrome from the image data of the documents transmitted from the image signal processing unit 102, and sends the judgement result to the CPU 101.

The CPU 101 stores the image data of the documents into the image memory 104, and forms a management table in which a storing position (i.e., an address) of the image data of each document is stored corresponding to the page number of the document and the judgement result given by the document judging unit 103, that is, whether the document is color or monochrome. This management table is then stored in the RAM 107.

The image memory 104 receives an instruction from the CPU 101 to read the image data of a specified address and then sends the image data stored in the specified address to the laser diode driving unit 105.

The laser diode driving unit 105 has the laser diodes scan the photosensitive drums 48C to 48Y in accordance with the image data sent from the image memory 104, based on a control program in the ROM 106.

The CPU 101 receives an input of detection signals of various sensors and controls the activation of the cam driving motor 73 and the timing of scanning performed by the laser diode driving unit 105 in accordance with a control program in the ROM 106.

The CPU 101 also receives various key inputs through the operation panel 31 and indicates respective operation timings to the automatic document transport device 10, the image read unit 20, and the print unit 40 in accordance with the set copy mode. In this way, the CPU 101 controls the overall operation of the components and realizes a smooth copying operation.

Figure 7:
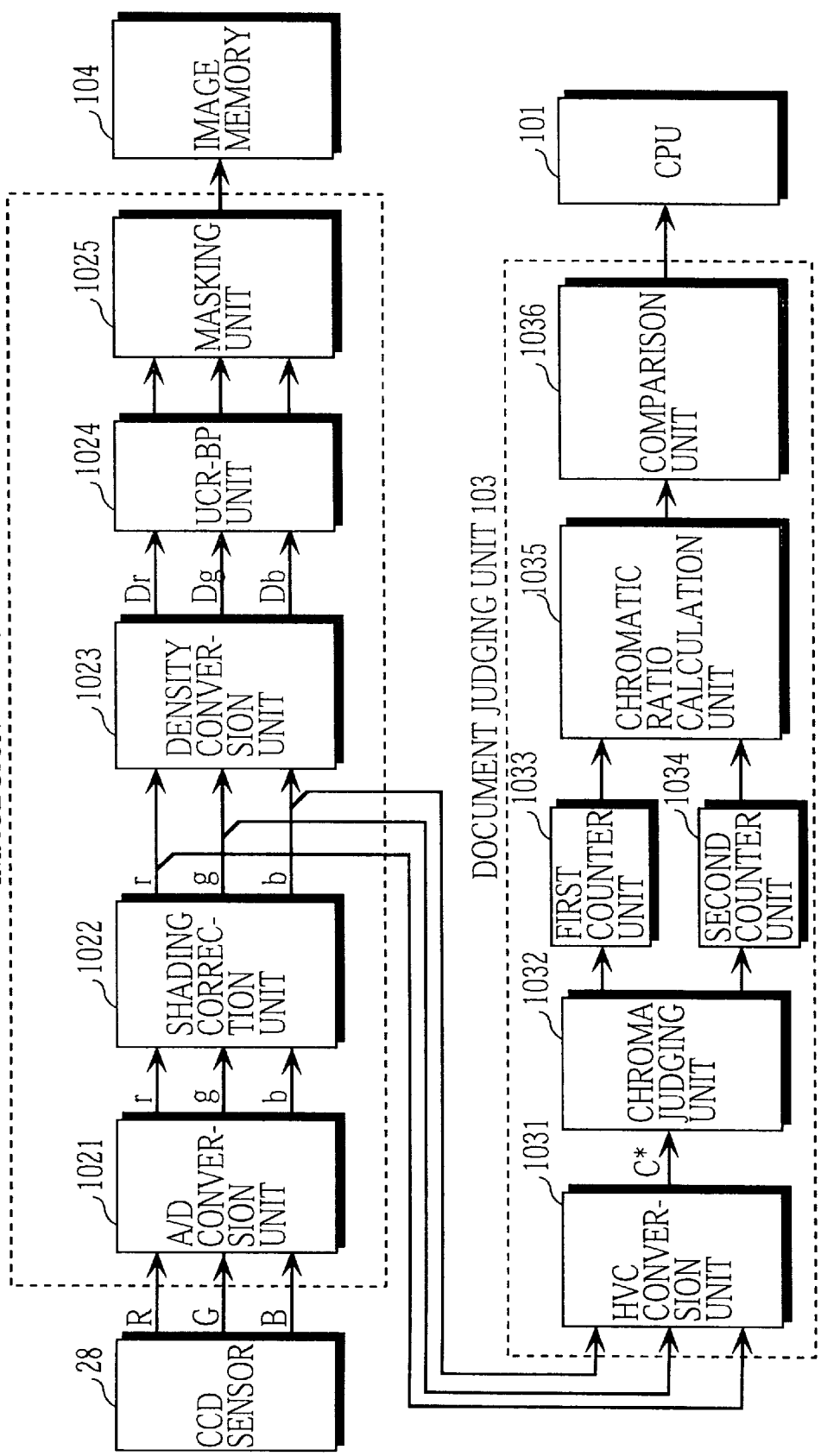
FIG. 7 is a block diagram showing the detailed constructions of an image signal processing unit and a document judging unit provided in the control unit.

FIG. 7 is a block diagram showing the constructions of the image signal processing unit 102 and the document judging unit 103.

Image signals, on which photoelectric transfer processing has been performed by the CCD color image sensor 28 of the image read unit 20, are converted into multivalued digital R, G, and B image data by an A/D conversion unit 1021. A predetermined shading correction is then performed on the converted image data by a shading correction unit 1022.

The shading-corrected r, g, and b image data is sent to a density conversion unit 1023 and an HVC conversion unit 1031 which is provided in the document judging unit 103.

The shading-corrected image data sent to the density conversion unit 1023 is reflectance data. As such, the shading-corrected image data is converted into Dr, Dg, and Db density data for the actual printed image. After this, a UCR-BP (Undercolor Removal-black Paint) unit 1024 performs black paint (BP) processing by calculating a predetermined ratio of a common part of the density data for the three colors as a black density to improve reproduction of black, as well as performing undercolor removing (UCR) processing to deduct the black density from the image data of the three colors.

A masking processing unit 1025 performs linear correction processing on the image data for Dr, Dg, and Db, on which the BP processing and the UCR processing have been performed, to make the color reproduction as ideal as possible. Then, the image data is converted into the density data for C, M, Y, and K, and is sent to the image memory 104 where the density data C, M, Y, and K is stored for each page.

Meanwhile, the image data r, g, and b sent from the shading correction unit 1022 to the HVC conversion unit 1031 of the document judging unit 103 is converted into data for Hue angle (H*), Value (V) and Chroma (C*) of a color area signal in a uniform color space of the Munsell color system in accordance with predetermined conversion equations. Of this data, the Chroma (C*) data is sequentially sent to a chroma judging unit 1032 for each pixel.

In accordance with the Chroma (C*) data inputted from the HVC conversion unit 1031, the chroma judging unit 1032 judges whether each pixel is chromatic or achromatic. The chroma judging unit 1032 has a predetermined threshold as a judgement standard and judges whether a pixel is chromatic or achromatic by checking whether the value of the Chroma (C*) data exceeds the predetermined threshold. The chroma judging unit 1032 sequentially transmits a predetermined signal to a first counter unit 1033 on judging that a pixel is chromatic, and to a second counter unit 1034 on judging that a pixel is achromatic.

On completing the transmission of the predetermined signals for the pixel data of one page, the chroma judging unit 1032 sends a page completion signal to both the first counter unit 1033 and the second counter unit 1034.

The first counter unit 1033 and the second counter unit 1034 increment respective internal counters by "1" whenever a predetermined signal is received from the chroma judging unit 1032. On receiving the page completion signal, the first counter unit 1033 and the second counter unit 1034 send the respective count values to a chromatic ratio calculation unit 1035 and reset the count values.

The chromatic ratio calculation unit 1035 divides the value inputted from the first counter unit 1033 (i.e., the number of the chromatic pixels) by the sum of the values inputted from the first counter unit 1033 and the second counter unit 1034 (i.e., the number of the chromatic pixels+ the number of the achromatic pixels) to obtain the ratio of the number of the chromatic pixels to the number of pixels in the page. The calculated ratio value is sent to a comparison unit 1036.

The comparison unit 1036 compares the calculated ratio value inputted from the chromatic ratio calculation unit 1035 with a predetermined ratio value, 0.01 (i.e., 1%) for example. If the calculated value is equal to or above the predetermined value, the comparison unit 1036 judges that the document is chromatic, that is, the document is color. If not, the comparison unit 1036 judges the document is achromatic, that is, the document is monochrome. The comparison unit 1036 then sends the judgement result to the CPU 101. It should be noted here that the predetermined value is not limited to 1%, and it may be 0.1% for a more precise judgement as to whether a document is color or monochrome.

Note that the CPU 101 can easily judge the copy mode of a document by reading the management table in the RAM 107, which stores the page number of the document and the color judgement result given by the document judging unit 103 corresponding to the storing position (the address) of the image data in the image memory 104.

Accordingly, the copy mode of the image formation can be judged for each document, so that the copier can perform copying operations by sequentially transporting a plurality of documents including both color and monochrome documents to the platen glass 21 using the automatic document transport device 10.

The ROM 106 previously stores a time period between the start time of supplying a recording sheet to the transport belt 51 by the pair of synchronizing rollers 45, that is, when the timing clutch is turned ON, and the start time of scanning the surface of the photosensitive drums 48C to 48K by the laser diode drive unit 105 (hereinafter, this time is referred to as the "scan waiting time"), for each photosensitive drum. Here, the scan waiting time is obtained as described below.

FIG. 2 shows the state of the transfer unit 50 in the color copy mode. The lengths of the transportation path of a recording sheet (referred to as the "transportation path length" hereinafter), that is, between the position where the edge of the recording sheet touches the pair of synchronizing rollers 45 and the respective transfer positions where images are respectively transferred onto the recording sheet by the photosensitive drums 48C to 48K and the corresponding transfer chargers 52C to 52K, are referred to as Lc to Lk. Also, note that the length along the circumference of each photosensitive drum (all four photosensitive drums having the same diameter) from the scanning position to the transfer position is measured and referred to as Lo, and the transport speed of the transport belt 51 is referred as V. The transport speed of the transport belt 51, the rotation speed of the synchronizing roller 45, and the rotation speed of the photosensitive drums are the same. Here, the scan waiting times Tc to Tk of the photosensitive drums 48C to 48K are obtained using the following equations.

$$Tc=(Lc-Lo)/V$$

$$Tm=(Lm-Lo)/V$$

$$Ty=(Ly-Lo)/V$$

$$Tk=(Lk-Lo)/V$$

As shown in FIG. 5, the transportation path length toward the photosensitive drum 48K in the monochrome copy mode is longer than that in the case of the color copy mode. Here, the longer transportation path length is referred to as Lk'. For this reason, the time period between when a recording sheet is supplied to the transport belt 51 by the pair of synchronizing rollers 45 and when the recording sheet reaches the transfer position under the photosensitive drum 48K used for black image formation in the monochrome mode is different from the time period in the color copy mode (this difference time is referred to as the "mode time difference"). More specifically, the time period in the monochrome copy mode is longer than that in the color copy mode, and the time difference can be obtained using the following equation.

$$\Delta t=(Lk'-Lk)/V$$

Here, the scan waiting time of the photosensitive drum 48K in the monochrome copy mode, which is referred to as Tk', is lengthened by the mode time difference $\Delta t$. The value Tk' is obtained using the following equation.

$$Tk'=Tk+\Delta t$$

It should be noted here that the ROM 106 stores Tc to Tk and mode time difference Δt, with Tk' being obtained by executing a calculation for adding Δt to Tk as necessary. The mode time difference Δt is different to each copier within a range, such as manufacturing tolerances, and also fluctuates due to surrounding conditions, such as the temperature inside the copier. As such, the mode time difference Δt can be changed if necessary using the operation panel 31 shown in FIG. 6 or an external interface (not illustrated).

Figure 8:
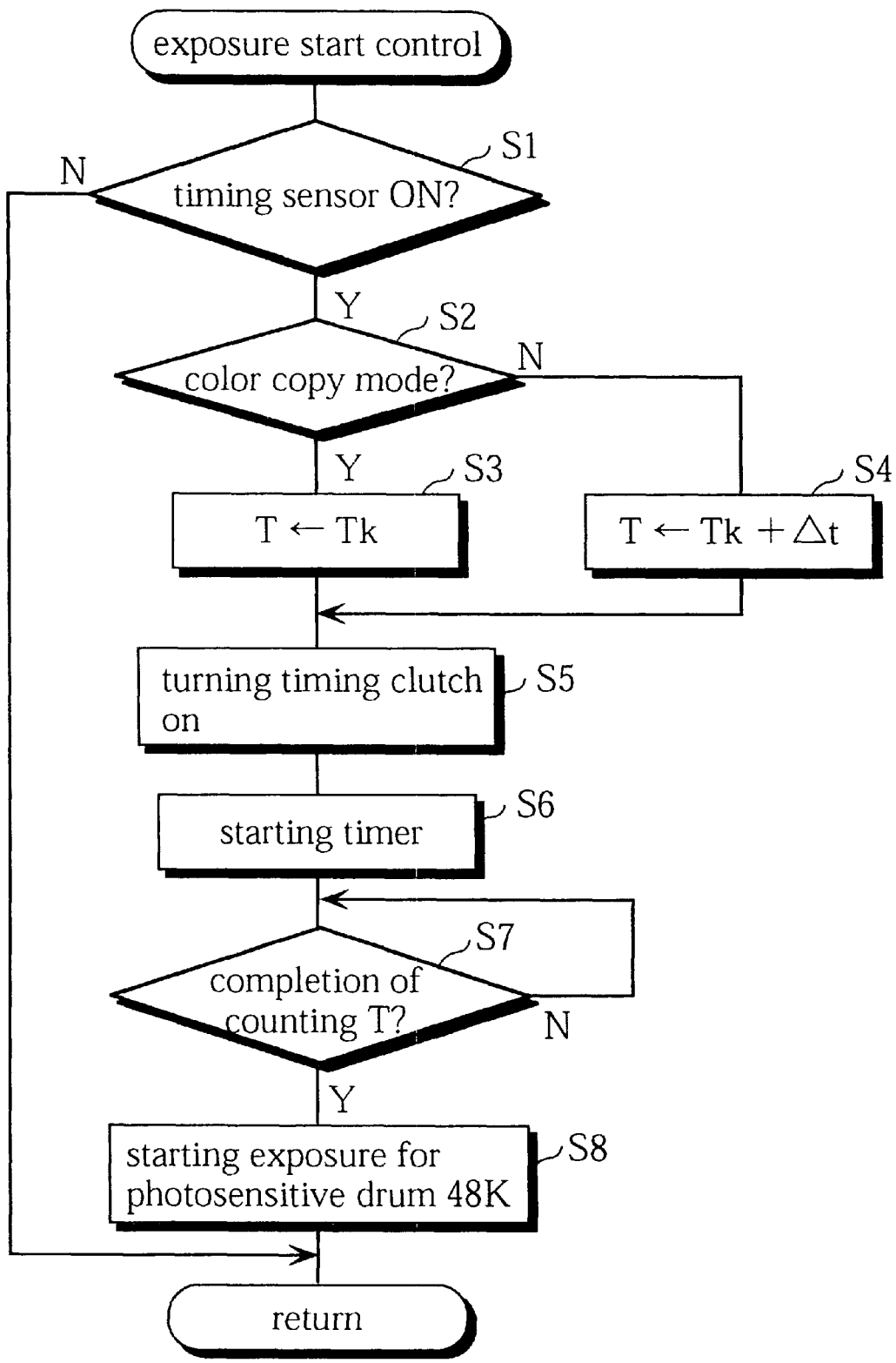
FIG. 8 is a flowchart showing the exposure starting control of a photosensitive drum for a black image formation.

Next, the exposure start control of the photosensitive drum 48K used for black image formations is described, with reference to the flowchart in FIG. 8. In the present example, the auto mode is selected, so that the copy mode is automatically selected between the monochrome copy mode and the color copy mode depending on whether a read document is a color or monochrome document.

When the timing sensor 46 is turned ON by the leading edge of the recording sheet on which the image is to be transferred ("Yes" in step S1), the CPU 101 judges whether the mode to be set for the recording sheet is the color copy mode by referring to the management table (step S2). If so, the CPU 101 sets Tk as the scan waiting time T (step S3), and, if not (that is, the mode to be set is the monochrome copy mode), the CPU 101 sets "Tk+Δt" as the scan waiting time T (step S4). The CPU 101 then proceeds to step S5.

In step S5, the CPU 101 turns the timing clutch ON and starts supplying a recording sheet to the transport belt 51 as well as starting the internal timer of the CPU 101 (step S6). After counting the scan waiting time T by the internal timer ("Yes" in step S7), the CPU 101 starts the scanning of the photosensitive drum 48K used for black image formations (step S8).

It should be noted here that when the current copy mode is changed and the position of the shift frame 54 is to be switched, the switching operation has been performed in another control routine before the timing clutch is turned ON in step S5.

Figure 9:
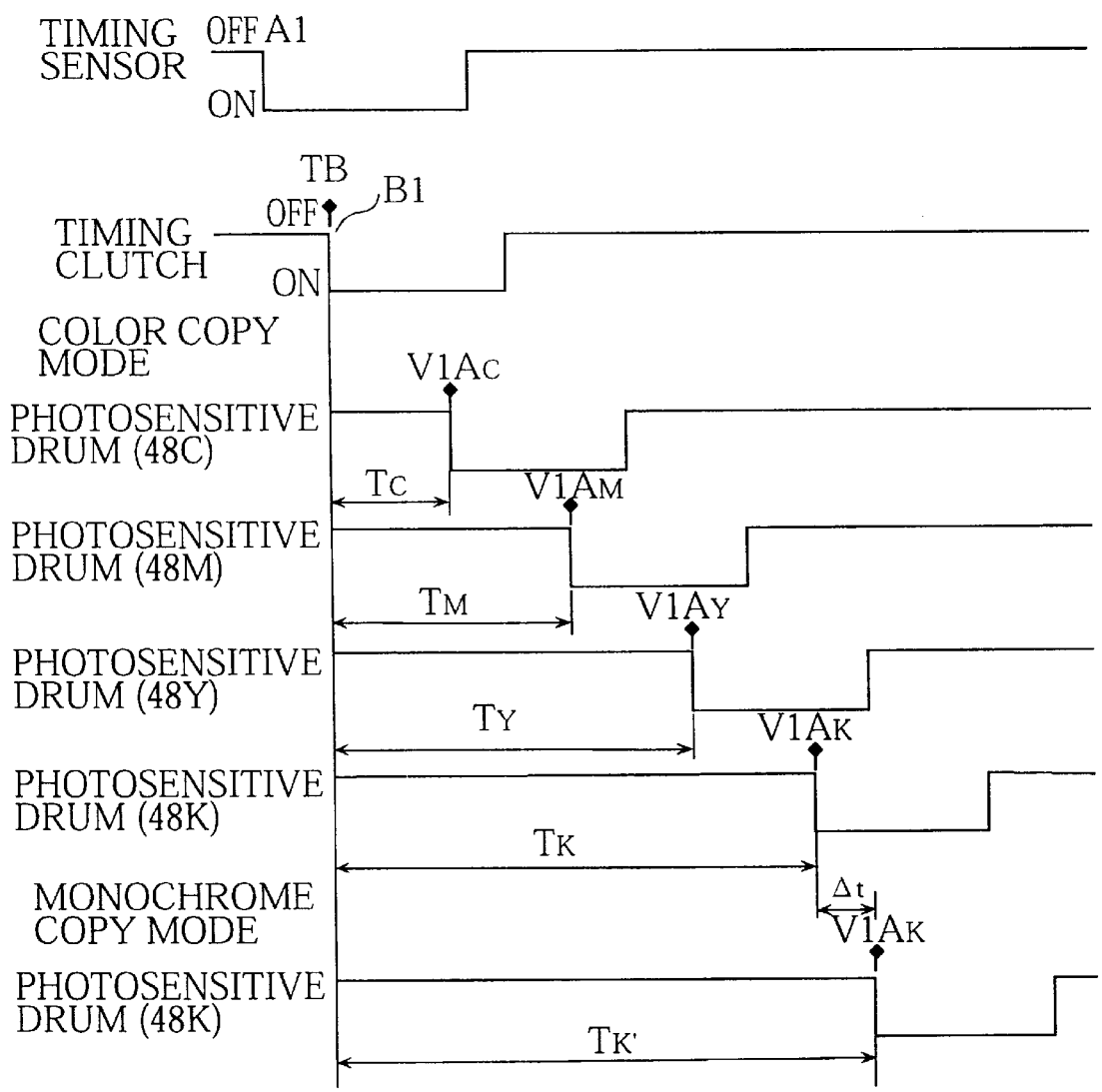
FIG. 9 is a timing chart of exposure starting timing for each photosensitive drum of the full-color copying machine.

Next, the exposure start control of the photosensitive drums 48C to 48K is explained, with reference to the timing chart of FIG. 9.

The leading edge of a recording sheet supplied from the paper cassette 42 is detected by the timing sensor 46 (A1) and edge skew correction is performed by the pair of synchronizing rollers 45. After this, a transportation start signal TB turns ON the timing clutch (B1), and accordingly, the pair of synchronizing rollers 45 is rotated to carry the recording sheet to the transport belt 51.

In the color copy mode, signals VIAc to VIAk for starting the scanning of the photosensitive drums 48C to 48K are respectively issued when the corresponding scan waiting times Tc to Tk have elapsed from when the transportation start signal TB was issued.

Meanwhile, in the monochrome copy mode, the signal VIAk for starting the scanning of the photosensitive drum 48K is issued when the time Tk', which is Δt longer than Tk, has elapsed.

As described above, in the image forming apparatus of the first embodiment, the exposure start time of the photosensitive drum used for black image formations is changed in accordance with the difference of the transportation path length incurred when the mode is changed between the color copy mode and the monochrome copy mode. As a result, the image is always transferred onto the recording sheet at the correct position.

Second Embodiment

The image forming apparatus of the second embodiment is the same as the image forming apparatus of the first embodiment, except for the construction of the transfer unit. Therefore, the common components are assigned the same numerals as in the first embodiment. The explanation of the common components is omitted and only the different components are explained.

Figure 10:
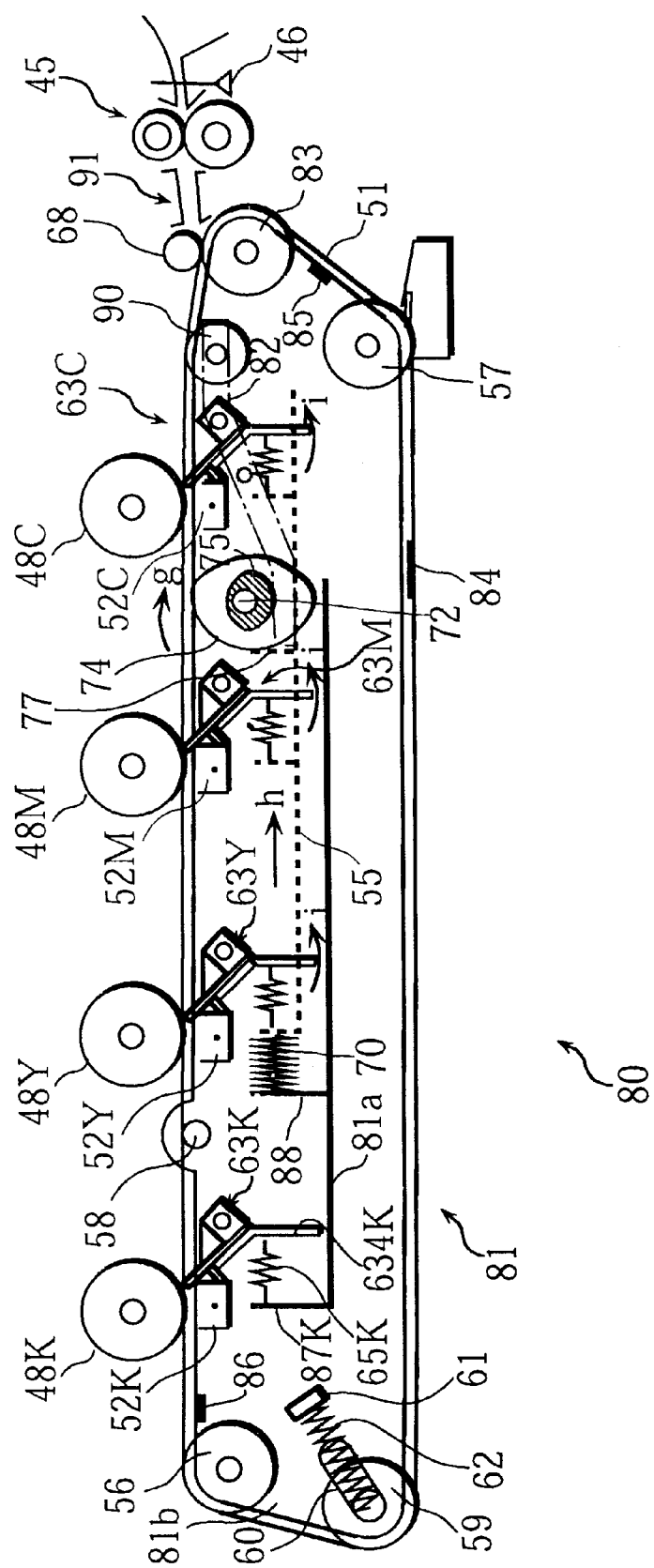
FIG. 10 is an enlarged view of the construction of a transfer unit of the full-color copying machine in the color copy mode in the second embodiment.

FIG. 10 shows a front view of the transfer unit 80. The transfer unit 80 is composed of a main frame 81, a slide frame 55, and a shift lever 82. In FIG. 10, the main frame 81 is shown by a solid line, the slide frame 55 by a dotted line, and the shift lever 82 by a dot-dash line.

The main frame 81 is formed of a base plate 81a that has a predetermined width (parallel to the viewing direction in FIG. 10) and side plates 81b on the front side and the rear side of the base plate 81a (as the copier is viewed in FIG. 10). Rotational axes of slave rollers 56 and 57, an assistance roller 58, a tension roller 59, and a drive roller 83 are set to freely rotate at the positions on the side plates 81b shown in FIG. 10 via respective bearings (not illustrated). A motor (not illustrated) for driving the drive roller 83 is fixed to one of the side plates 81b, with an output shaft of the motor and the rotational axis of the drive roller 83 being coupled.

The transport belt 51 is made up of transparent polyethylene terephthalate (PET), and runs around the rollers described above. Reflecting tape 84 is affixed to a position on the inward surface of the transport belt 51 which does not affect image formation. Reflectance-type photo sensors 85 and 86 are mounted on the side plates 81b via mounting elements (not illustrated). The photo sensor 85 is set between the slave roller 57 and the drive roller 83, and the photo sensor 86 is set between the photosensitive drum 48K and the slave roller 56, with respective set positions being located for the detection of the reflecting tape 84 which moves as the transport belt 51 is rotated.

Transfer chargers 52C to 52K are set between the side plates 81b of the main frame 81, being located directly under the photosensitive drums 48C to 48K. Transfer backups 63C to 63K are respectively set on the right (as viewed in FIG. 10) of the corresponding transfer chargers 52C to 52K. The tensile spring 65K is set between the spring mounting unit 634K of the transfer backup 63K and a spring mounting component 87K standing on the base plate 81a of the main frame 81.

The slide frame 55 is set above the base plate 81a via a guiding component (not illustrated), being set to freely slide sideways in a longitudinal direction. A compressed spring 70 is set between the left side (as viewed in FIG. 10) of the slide frame 55 and a spring mounting component 88 standing on the base plate 81a of the main frame 81.

Figure 11:
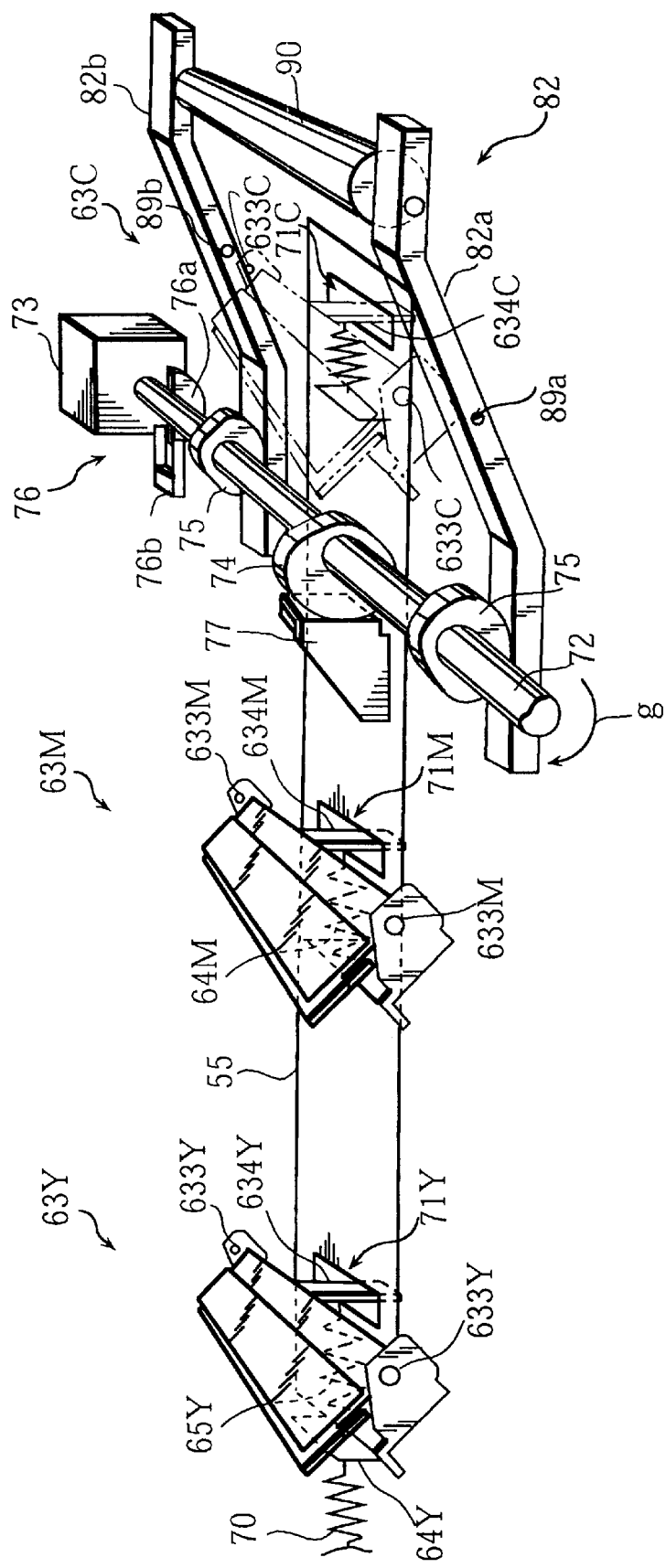
FIG. 11 is a perspective view of part of the transfer unit of the second embodiment.

As shown in FIG. 11, the shift lever 82 is composed of lever components 82a and 82b. The lever component 82a is mounted on the front side frame 81b of the main frame 81 while the lever component 82b is mounted on the rear side frame 81b using respective mounting components (not illustrated) via respective mounting holes 89a and 89b, with these lever components 82a and 82b freely rotating. A shift roller 90 is also mounted on the right part (as viewed in FIG. 11) of the shift lever 82 to freely rotate, being set between the lever components 82a and 82b.

In the second embodiment, the shift cams 75 mounted to the cam shaft 72 are in contact with the left side of the lever components 82a and 82b of the shift lever 82. As such, together with the rotation of the shift cams 75, the shift lever 82 is rotated about the mounting holes 89a and 89b and the shift roller 90 is shifted upward and downward.

Although the drive roller 67 is shifted in the first embodiment, the drive roller 83 of the second embodiment is fixed. As such, a fixed guiding component 91 is set between the pair of synchronizing rollers 45 and the drive roller 83 via mounting components (not illustrated) set on the side plates 81*b* of the main frame 81.

Next, the overall operation of the transfer unit 80 is explained for the case when the current copy mode is changed in the second embodiment.

In FIG. 10, the transfer unit 80 is in the color copy mode. More specifically, the right part of the shift lever 82 is shifted upward with the left part pushed down by the shift cams 75, and accordingly, the shift roller 90 is in its uppermost position. As a result, the transport belt 51 is pushed up and comes into contact with the four photosensitive drums 48C to 48K, the transfer backups 63C to 63K press the corresponding photosensitive drums 48C to 48K through the transport belt 51, and an optimum nip width between the transport belt 51 and the photosensitive drums 48C to 48K is ensured.

Figure 12:
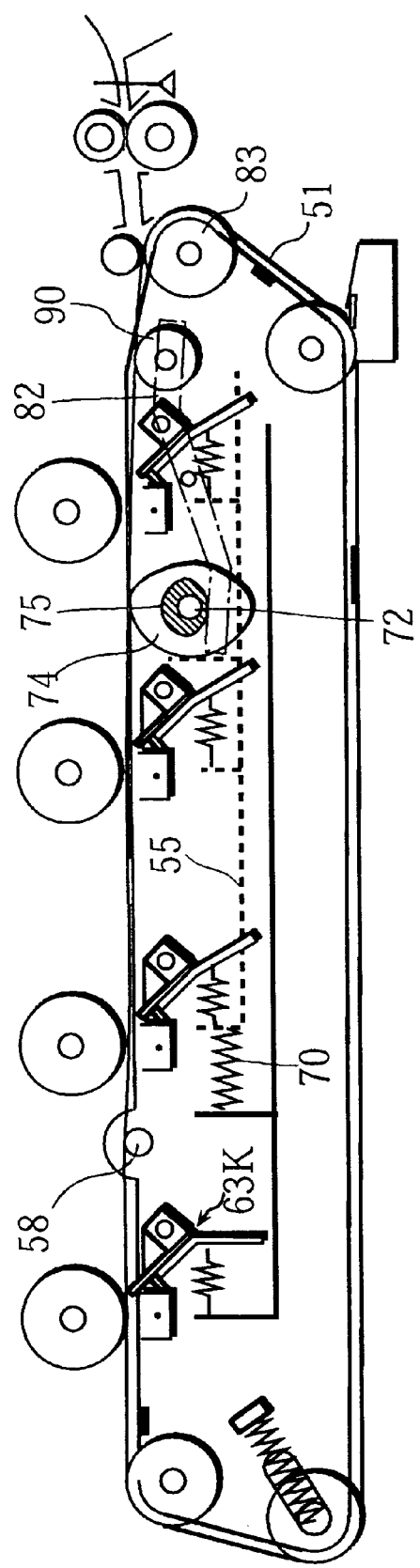
FIG. 12 is an enlarged view of the construction of the transfer unit of the full-color copying machine in the monochrome copy mode.

In order to change from the color copy mode to the monochrome copy mode, the cam driving motor 73 shown in FIG. 11 is activated. If the cam shaft 72 is judged from the detection result given by the photo sensor 76*b* shown in FIG. 11 to have been rotated by 180 degrees in the direction indicated by the arrow g, the shift lever 82 is rotated clockwise by a force due to its own weight (including the weight of the shift roller 90) or due to the force of the transport belt 51 which acts via the shift roller 90. As a result, the shift roller 90 moves to its lowermost position, as shown in FIG. 12.

Consequently, the section of the transport belt 51 between the assistance roller 58 and the drive roller 83 will have been shifted downward, and accordingly, the transport belt 51 will have been separated from the photosensitive drums 48C to 48Y, leaving a sufficient space for the recording sheet transported by the transport belt 25 to pass the photosensitive drums 48C to 48Y. Meanwhile, the assistance roller 58 is provided for the photosensitive drum 48K and the transport belt 51, so that aside from the case where the recording sheet needs to pass by the black image forming unit 41K without image formation being performed, the transport belt 51 can be kept in contact with the photosensitive drum 48K regardless of the position of the shift roller 90, i.e., regardless of whether monochrome copy mode or color copy mode is presently operational. In addition, an optimum nip width is secured between the transport belt 51 and the photosensitive drum 48K by the transfer backup 63K.

When the cam shaft 72 is rotated, the slide cam 74 also rotates and the part of the slide cam 74 which is in contact with the cam follower 77 will change from the widest part to the narrowest part. Consequently, the slide frame 55 slides to the right (that is, in the direction of the arrow h in FIG. 10) in accordance with the tension of the compressed spring 70, and the left walls of the rectangle holes 71C to 71Y shown in FIG. 11 provided for the slide frame 55 push the spring mounting units 634C to 634Y of the transfer backups 63C to 63Y to the right. As a result, the transfer backups 63C to 63Y rotate about the mounting holes 633C to 633Y in the direction indicated by the arrow i in FIG. 10, and the backup blades 632C to 632Y are separated from the transport belt 51.

When the current mode is changed from the monochrome copy mode to the color copy mode, the cam shaft 72 further rotates by 180 degrees. This is to say, all the components move according to the reverse of the stated operation, and the state of the transfer unit 80 is changed from the state in FIG. 12 to the state in FIG. 10.

In the first embodiment, the mode time difference Δt is obtained by executing a calculation for dividing the difference of the transportation path length between the monochrome copy mode and the color copy mode by the transportation speed. Meanwhile, in the second embodiment, the mode time difference Δt is obtained through actual measurement.

In the second embodiment, the shift roller 90 pushes the transport belt 51 up and down, and as a result, the transportation path length toward the photosensitive drum 48K fluctuates in accordance with the fluctuation in the length of the transport belt 51 between the drive roller 83 and the assistance roller 58. Therefore, when an arbitrary point on the transport belt 51 passes through this section between the drive roller 83 and the assistance roller 58, the passing time is different between the monochrome copy mode and the color copy mode. This passing time difference is the mode time difference Δt.

Figure 13:
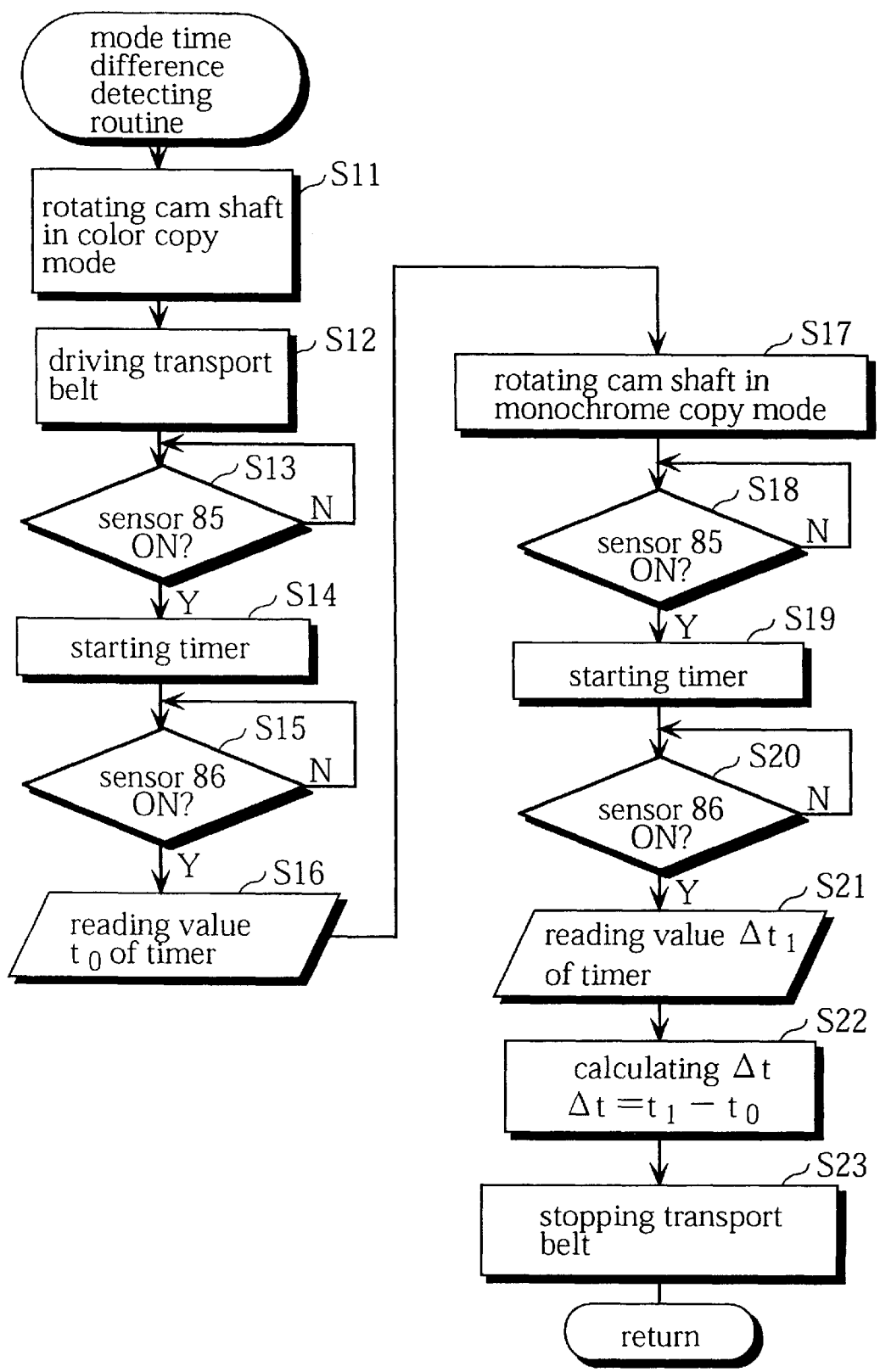
FIG. 13 is a flowchart showing the mode time difference detecting routine performed by the control unit of the second embodiment.

Processing for obtaining the mode time difference Δt is explained as follows, with reference to the flowchart of FIG. 13.

The CPU 101 rotates the cam shaft 72 and has the shift roller 90 moved to its uppermost position, i.e., the same position as in the color copy mode (step S11). Then the CPU 101 activates the transport belt 51 (step S12).

When the photo sensor 85 is turned ON by the edge of the reflecting tape 84 ("Yes" in step S13), an internal timer of the CPU 101 starts counting (step S14). When the photo sensor 86 is turned ON by the edge of the reflecting tape 84 ("Yes" in step S15), the CPU 101 reads the current value t0 of the timer and stores the value in the RAM 107 (step S16).

After this, the CPU rotates the cam shaft 72 and has the shift roller 90 moved to its lowermost position, i.e., the same position as in the monochrome copy mode (step S17). When the photo sensor 85 is turned ON by the edge of the reflecting tape 84 ("Yes" in step S18), the internal timer of the CPU 101 starts counting (step S19). When the photo sensor 86 is turned ON by the edge of the reflecting tape 84 ("Yes" in step S20), the CPU 101 reads the current value t1 of the timer and stores the value in the RAM 107 (step S21).

The mode time difference Δt is obtained by subtracting t0 stored in the RAM 107 from t1 stored in the RAM 107 (step S22), and the CPU 101 stops the transport belt 51 (step S23).

It should be noted here that the detection of Δt is performed when the power of the copier is turned on. The value of Δt fluctuates depending on the surrounding conditions, such as the temperature inside the copier, so that the detection of Δt may be performed as necessary and the value of Δt may be updated. For example, the detection of Δt may be performed when the copier has been on standby for more than two hours or after jam detection processing is performed.

The exposure start control of the photosensitive drum 48K used for black image formations is the same as that of the first embodiment, except that Δt obtained as described above is used as the mode time difference Δt in step S4 of the flowchart in FIG. 8. Therefore, the explanation of the exposure start control of the photosensitive drum 48K is not given in the present embodiment.

Figure 14:
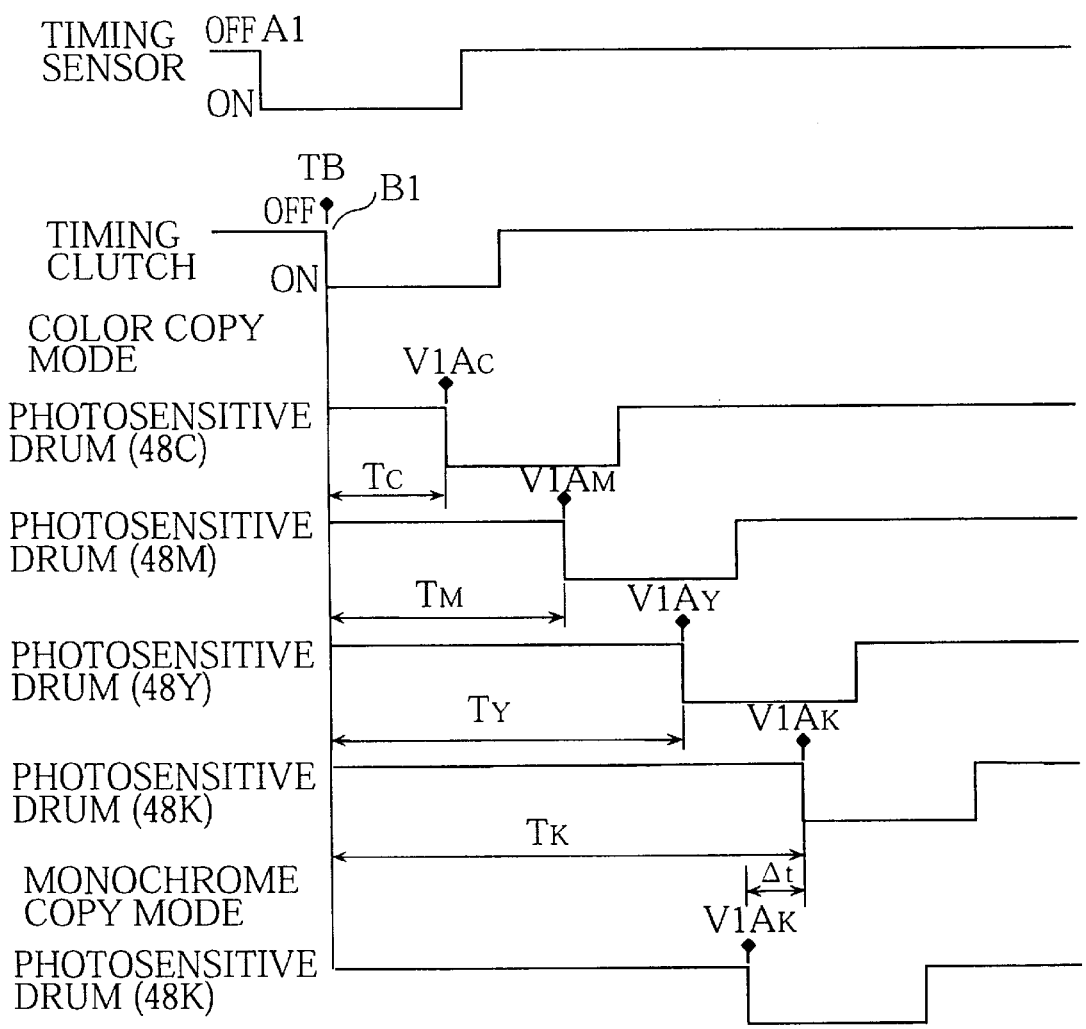
FIG. 14 is a timing chart of exposure starting timing for each photosensitive drum performed by the control unit of the second embodiment.

FIG. 14 is the timing chart of the exposure start control of the photosensitive drums 48C to 48K.

In the monochrome copy mode in the first embodiment, the signal VIAk for starting the scanning of the photosensitive drum 48K is issued when the time Tk', which is Δt longer than Tk of the color copy mode, has elapsed. In the present embodiment, meanwhile, the signal VIAk is issued when the time, which is Δt shorter than Tk, has elapsed. Since only the timing is different, the detailed explanation is omitted in the present embodiment.

By means of the image forming apparatus of the first and second embodiments, Δt indicating the time difference between the color copy mode and the monochrome copy mode is detected. Here, the time difference occurs in the time period between when a recording sheet is supplied by the pair of synchronizing rollers 45 and the recording sheet reaches a transfer position of the photosensitive drum 48K used for black image formations depending on which mode is operational. In accordance with Δt, the scan waiting time of the photosensitive drum 48K is changed, so that an image is always transferred onto the recording sheet at the correct position.

Third Embodiment

Figure 15:
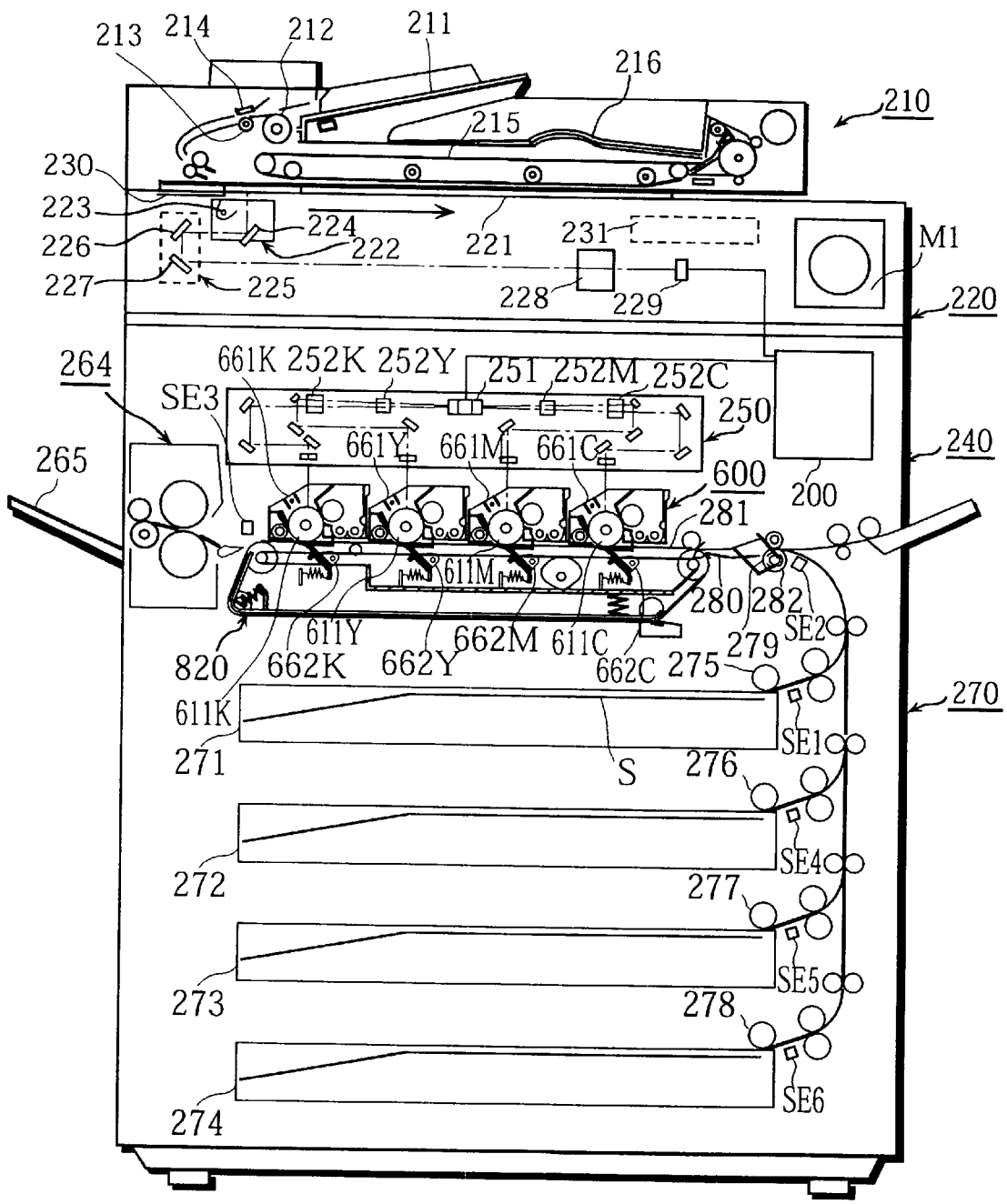
FIG. 15 shows an overall construction of the tandem-type full-color copying machine of the third embodiment.

FIG. 15 shows an overall construction of the copier of the third embodiment.

As shown in FIG. 15, this copier is roughly divided into an automatic document transport device 210 for automatically transporting a document, an image read unit 220 for reading an image of the transported document, and a print unit 240 for printing the image read by the image read unit 220 onto the recording sheet.

The automatic document transport device 210 is provided with a document feeding tray 211, a paper supplying roller 212, a take-up roller 213, a take-up pad 214, a document transporting belt 215, and a document discharge tray 216. The automatic document transport device 210 transports a document set on the document feeding tray 211 to a predetermined document scanning position on a platen glass 221. After the document image has been scanned by a scanner 222 of the image read unit 220, the automatic document transport device 210 further transports the document to the right as the copier is viewed in FIG. 15 using the document transporting belt 215. Then, the document is discharged onto the document discharge tray 216.

The image read unit 220 is provided with an exposure lamp 223 for exposing the document, a scanner 222 including a mirror 224 for directing light emitted from the exposure lamp 223 parallel to the platen glass 221, mirrors 226 and 227 for directing the reflected light to a converging lens 228, and a CCD image sensor 229 for converting the light converged by the converging lens 228 into electrical signals.

When the automatic document transport device 210 has transported the document to the document scanning position on the platen glass 221, the scanner 222 is driven by a scanner motor M1 and moves laterally in the direction of the arrow shown in FIG. 15 to scan the document on the platen glass 221. The mirrors 226 and 227 are set in a slider 225 as one pair and move laterally in the same direction as the scanner 222 at a speed half that of the scanner 222. This keeps a light path length from the document to the converging lens 228 constant.

An image of the document exposed by the exposure lamp 223 of the scanner 222 is photoelectrically converted into electrical signals corresponding to color elements red, green, and blue, which are then sent to a control unit 200. The control unit 200 performs data correction processing on image data for each color element obtained by the photoelectric conversion. The image data is then separated into reproduction colors cyan, magenta, yellow, and black, and is temporarily stored in an image memory 104 (shown in FIG. 18) provided in the control unit 200. Note that the color elements red, green, and blue are respectively referred to as "R", "G", and "B", or "r", "g", and "b" hereinafter. Similarly, the reproduction colors cyan, magenta, yellow, and black are respectively referred to as "C", "M", "Y", and "K" hereinafter. A white plate 230 used for color correction is provided at the left end (as the copier is viewed in FIG. 15) of the platen glass 221.

The print unit 240 forms an image on a recording sheet S, such as a copying sheet, using a well-known electrophotographic technique. The print unit 240 is composed of an image processing system 600 for forming an image corresponding to the data for each color, an optical system 250, and a paper supplying system 270 for transporting the recording sheet S.

The optical system 250 has a laser diode (not illustrated) corresponding to each color and a polygon mirror 251 for deflecting laser beams emitted from laser diodes. When forming an image, the control unit 200 sequentially reads the image data of the current document page for each color from the image memory 104 shown in FIG. 18 and converts the image data into drive signals to have the laser diodes perform the light modulation. The laser beams emitted from the laser diodes are reflected off the polygon mirror 251 which is rotated by a polygon motor (not illustrated). Then, the laser beams respectively scan the surfaces of photosensitive drums 611C to 611K of the image processing system 600 in the main scanning direction via fθ lenses 252C to 252K and redirecting lenses to form electrostatic latent images. The electrostatic latent images are developed into visible images by developing units 613C to 613K shown in FIG. 16.

The paper supplying system 270 is composed of paper supplying cassettes 271 to 274 and a synchronizing roller 279. The recording sheet S is supplied by a corresponding one of paper supplying rollers 275 to 278 from a specified one of the paper supplying cassettes 271 to 274 and transported to transfer positions of the photosensitive drums 611C to 611K by the synchronizing roller 279 and the transport belt 281. Toner images respectively formed on the surfaces of the photosensitive drums 611C to 611K are sequentially transferred onto the recording sheet S at the transfer positions by electrostatic force of transfer blades 662C to 662K shown in FIG. 16. Each toner image is formed on the corresponding photosensitive drum 611C to 611K in synchronization with a timing at which the recording sheet S reaches the transfer position, so that all of the toner images are superimposed on the recording sheet S at the correct position.

It should be noted here that the pair of synchronizing rollers 279 is driven by a motor (not illustrated), and that the rotation is started and stopped in accordance with ON/OFF of a timing clutch 282 which is set between the pair of synchronizing rollers 279 and the motor.

Toner particles forming the toner image on the surface of the recording sheet S are fused and fixed in place by a fixing unit 264. The recording sheet S is then discharged onto a discharge tray 265. In this way, a color image is formed on the recording sheet S.

An operation panel 231 indicated by a dash line in FIG. 15 is provided on an optimum position on the top of the copier. The operation panel 231 is composed of a numeric keypad for setting the number of copies and a copy start key for indicating a start of copying.

Sensors SE1 to SE6 shown in FIG. 15 are jam detecting sensors and respectively detect the recording sheet S transported on each transportation path. The SE1 to SE6 respectively send a detection signal to the control unit 200. When the recording sheet S is not detected after a predetermined period of time has elapsed, the control unit 200 judges that a paper jam has occurred.

The copy operation has been explained in a case when all of the photosensitive drums 611C to 611K are in contact with the transport belt 281 in the color copy mode. When a black image is formed using only the photosensitive drum 611K in the monochrome copy mode, the copy operation is performed with the photosensitive drums 611C to 611Y having been separated from the transport belt 281.

Figure 16:
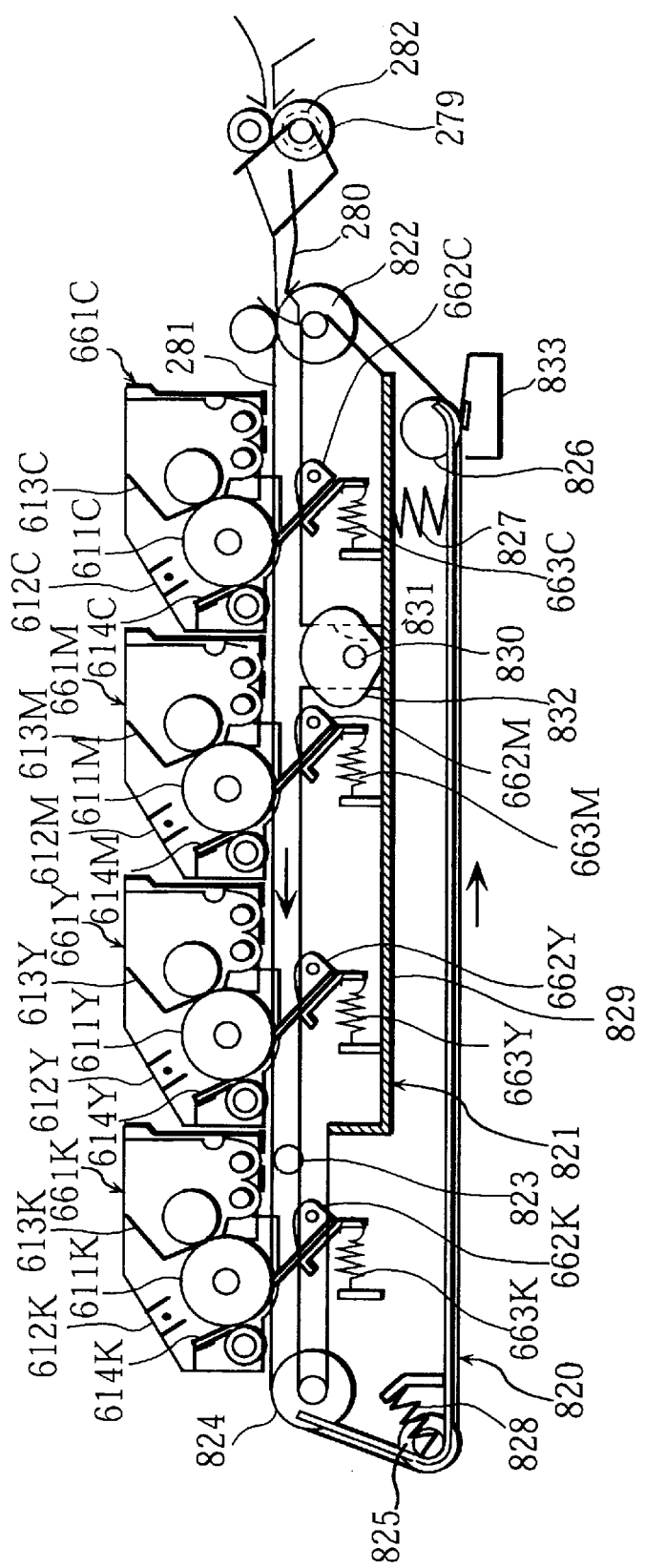
FIG. 16 is an enlarged view of the construction of the transfer unit of the third embodiment.

FIG. 16 shows an enlarged view of the construction of the image processing system 600.

As shown in FIG. 16, the image processing system 600 is composed of image forming units 661C to 661K and a transfer unit 820.

The image forming units 661C to 661K are respectively provided with transfer chargers 612C to 612K, developing units 613C to 613K, and cleaners 614C to 614K which are respectively set around the photosensitive drums 611C to 611K parallel to the rotational axes of the photosensitive drums 611C to 611K. The transfer unit 820 is composed of the transport belt 281 which runs over a drive roller 822, an auxiliary roller 823, a slave roller 824, a tension roller 825, a cleaning roller 826 and the transfer blades 662C to 662K which are set inside of the transport belt 281, facing the corresponding photosensitive drums 611C to 611K with the transport belt 281 in between.

The tension roller 825 is energized downward and to the left (as the copier is viewed in FIG. 16) by a tension spring 828, so that the tension of the transport belt 281 is properly maintained.

The drive roller 822, a stepping motor (not illustrated) for driving the drive roller 822, and the transfer blades 662C to 662Y aside from the transfer blade 662K are mounted on a shift frame 829 which is held to rotate clockwise and counterclockwise about the rotational axis of the slave roller 824. These components comprise a shift unit 821. The shift frame 829 is energized upward by a spring 827, with the upper surface of the shift frame 829 being contact with the circumferential surfaces of a pair of cam plates 832. The cam plates 832 are rotated by a driving device (not illustrated) whose driving source is a stepping motor or the like. Together with this rotation of the cam plates 832, the shift unit 821 is shifted upward and downward.

Note that a notch 831 is set on side plates of the shift frame 829, so that a rotational axis 830 of the cam plate 832 does not come into contact with the shift unit 821 while the shift unit 821 is being shifted.

The rotation of the cam plates 832 is controlled by the control unit 200. The control unit 200 detects the position of the cam plates 832 using a photo sensor (not illustrated) and controls the driving device to have the shift unit 821 stop at its uppermost position and lowermost position.

The transfer blades 662C to 662K are given an inverse potential of the charge carried by toner particles and used for transferring the toner images formed on the surfaces of the photosensitive drums 611C to 611K onto the recording sheet via electrostatic force. The transfer blades 662C to 662Y are set between the side plates of the shift frame 829, while the transfer blade 662K is set between side plates of a main frame (not illustrated). The transfer blades 662C to 662K are energized by springs 663C to 663K to rotate clockwise. The edges of the transfer blades 662C to 662K press the transport belt 281 toward the corresponding photosensitive drum 611C to 611K.

Accordingly, the transport belt 281 linearly comes into contact with the photosensitive drums 611C to 611K at the transfer positions, so that image transfer in the main scanning direction is stable.

Note that a belt cleaner 833 for removing toner particles and paper dust from the surface of the transport belt 281 is provided under the transfer unit 820 as shown in 48 FIG. 16.

A guiding component 280 is rotated about the rotational axis of the synchronizing roller 279 together with the shift of the shift unit 821 and can transport the recording sheet S to the transport belt 281 regardless of its position.

Figure 17:
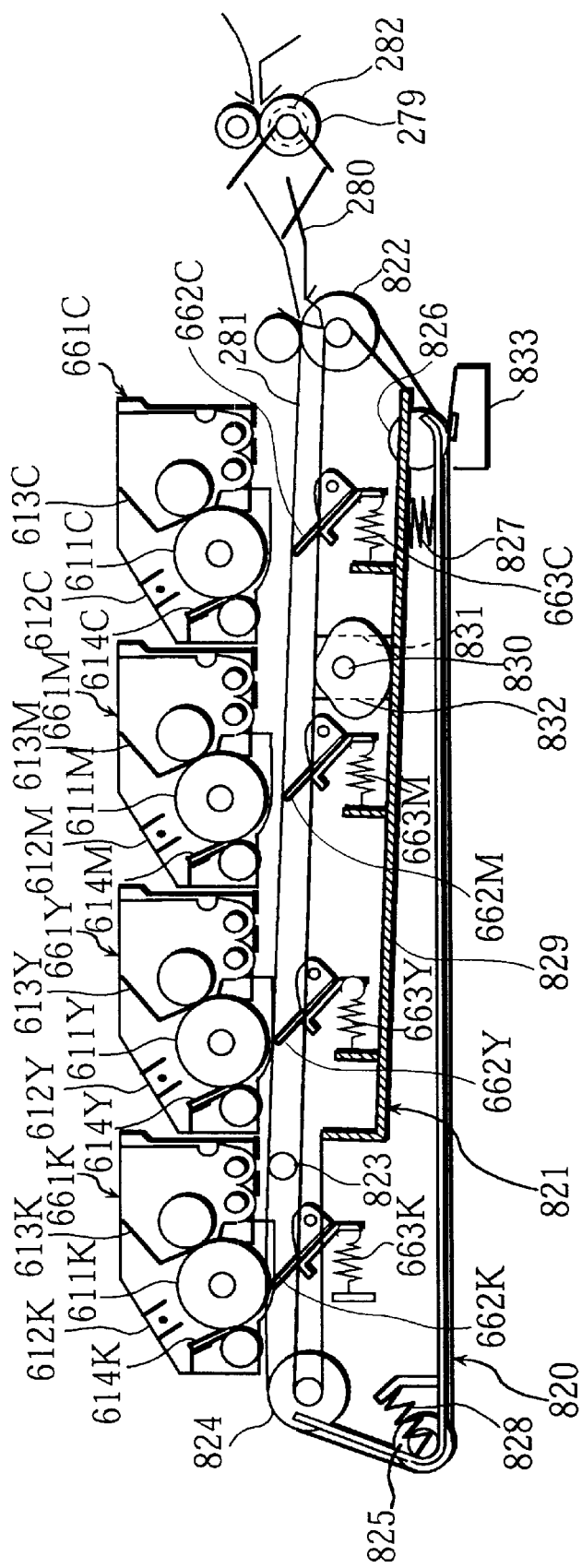
FIG. 17 is an enlarged view of the transfer unit of the third embodiment, with the shift unit being in the lowermost position.

When an image is formed in the color copy mode using the image processing system 600 having the stated construction, the shift unit 820 is maintained in a horizontal position as shown in FIG. 16. In this case, each toner image is transferred onto the recording sheet S to form a color image, with all of the photosensitive drums 611C to 611K being contact with the transport belt 281. Meanwhile, when an image is formed in the monochrome copy mode, the shift unit 820 is shifted downward as shown in FIG. 17. More specifically, the right part (as the copier is viewed in FIG. 17) from the auxiliary roller 823 is shifted downward. Accordingly, the photosensitive drum 611K stays in contact with the transport belt 281 while the photosensitive drums 611C to 611Y are separated from the transport belt 281. By stopping those photosensitive drums, wear and tear on the components around the photosensitive drums 611C to 611Y that are not used for forming the image in the monochrome copy mode can be prevented. The detailed description of the control operation performed when the copy mode is switched is given later in this specification.

Figure 18:
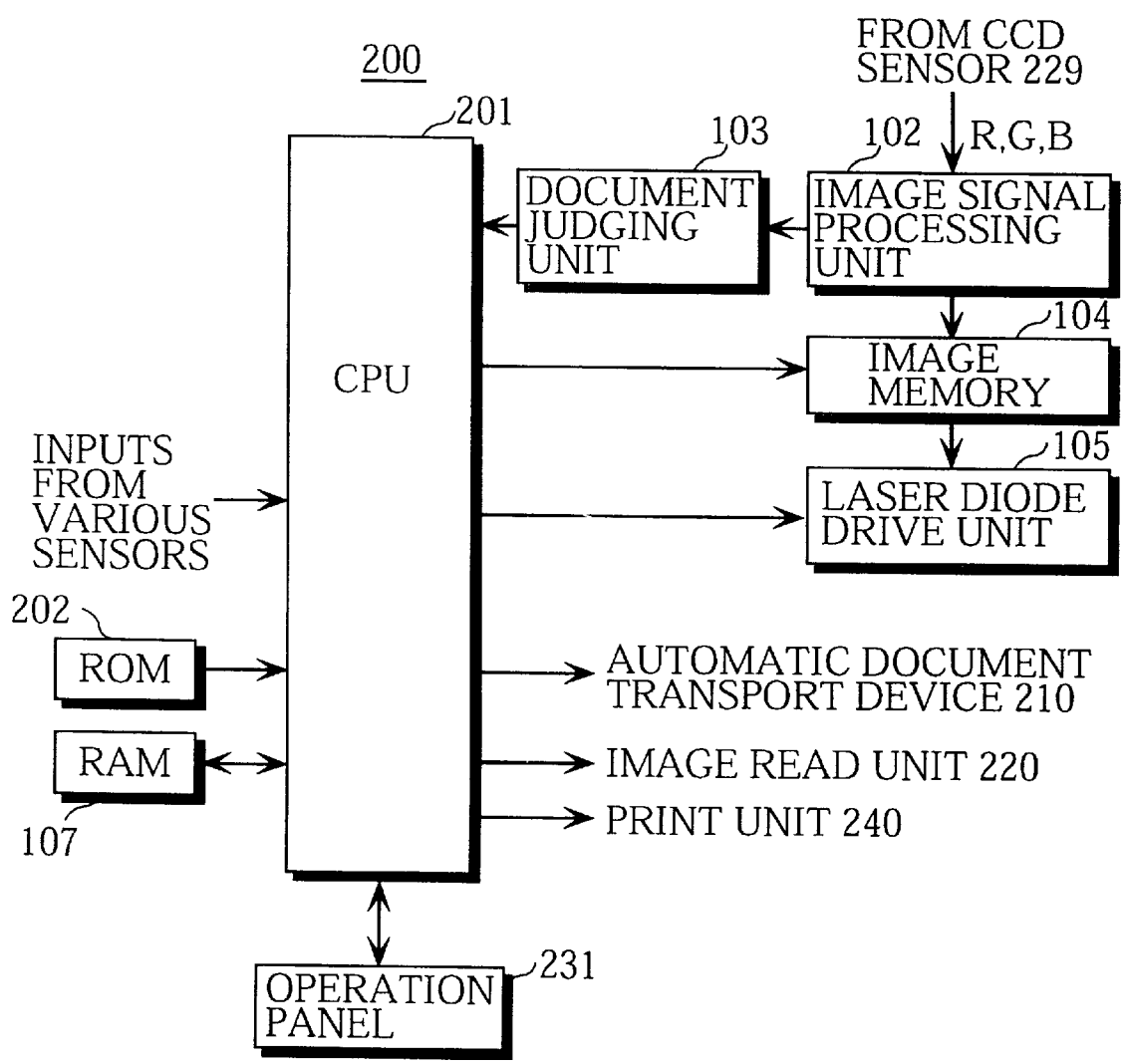
FIG. 18 is a block diagram showing the construction of the control unit of the third embodiment.

FIG. 18 is a block diagram showing the construction of the control unit 200. As shown in FIG. 18, the control unit 200 is composed of a CPU 201 as a main component, an image signal processing unit 102, a document judging unit 103, and a ROM 202. The construction of the control unit 200 is basically the same as that of the control unit 100 of the first embodiment shown in FIG. 6. Therefore, the explanation of the common aspects is omitted and only the different components are explained. In FIG. 18, the common components are assigned the same numerals as in FIG. 6.

The ROM 202 stores programs required for the copy mode switch control (described later) as well as programs for controlling the components, such as the print unit 240.

According to the programs for the copy mode switch control stored in the ROM 202, the CPU 201 controls the operation for the copy mode switching in successive copy operations and also controls operations performed by the automatic document transport device 210, the image read unit 220, and the print unit 240. In addition, the control unit 200 judges whether a paper jam has occurred. By controlling the various components, the CPU 201 ensures that copy operations are performed smoothly.

As in the first embodiment, the processing to determine the copy mode for each document is performed by the image signal processing unit 102 and the document judging unit 103 in the present embodiment.

The following is an explanation of the control operation that is performed when the copy mode is switched.

Figure 19:
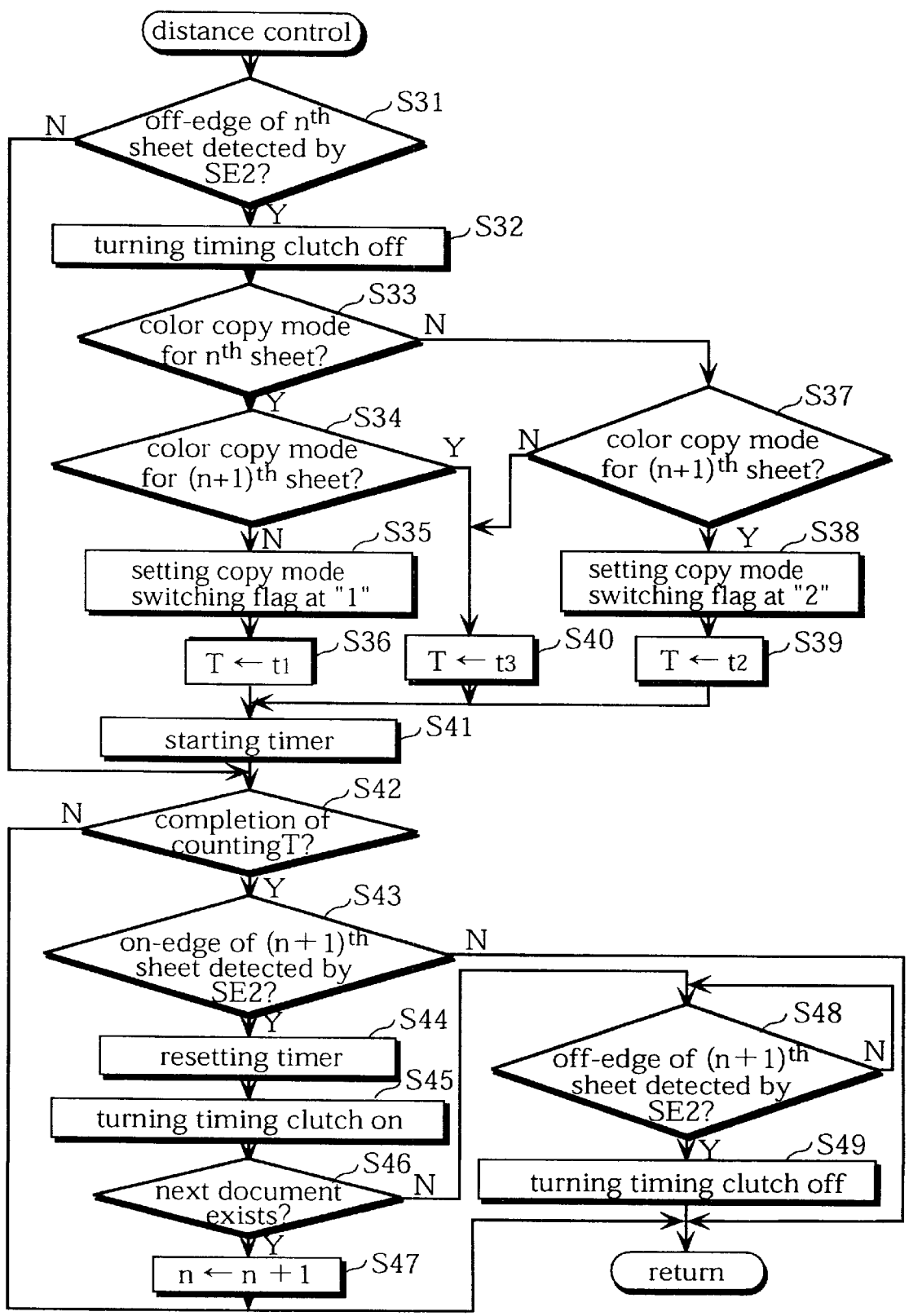
FIG. 19 is a flowchart showing a subroutine for controlling a distance between recording sheets when the successive copy operations are performed by the control unit of the third embodiment.
Figure 20:
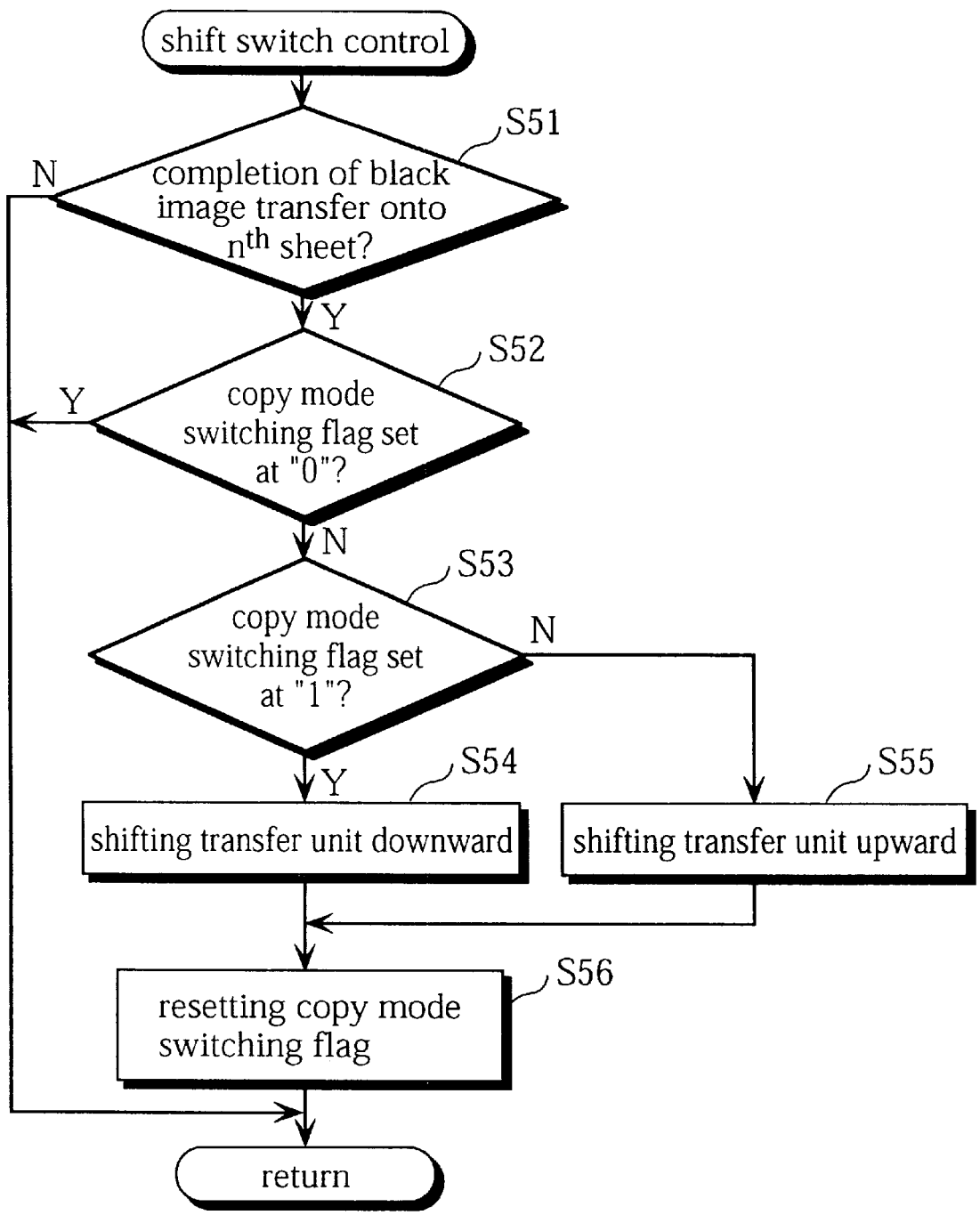
FIG. 20 is a flowchart showing a subroutine for controlling the shift switch of the transfer unit performed by the control unit of the third embodiment.

FIGS. 19 and 20 are the flowcharts showing the control operation performed when the copy mode is switched during successive copy operations. FIG. 19 shows a subroutine of a main routine (not illustrated) for controlling the entire copier. This subroutine is used for controlling a distance between the recording sheets during the successive copy operations.

In the successive copy operations, when the recording sheet S which is the nth sheet out of a plurality of recording sheets is transported to the transport belt 281 by the synchronizing roller 279, the CPU 201 judges whether the trailing edge of the recording sheet S has passed a timing sensor SE2 (step S31). More specifically, the CPU 201 detects an off-edge where a sensor output from the timing sensor SE2 is changed ON to OFF. Note that the number "n" referred to here is a variable.

After a predetermined period of time has elapsed since the detection of the off-edge, the CPU 201 turns off the timing clutch 282 to stop the rotation of the synchronizing roller 279 (step S32). This predetermined period of time is set to give enough time for the trailing edge of the recording sheet S to pass by a nip part of the synchronizing roller 279, in consideration of the distance from the timing sensor SE2 to the synchronizing roller 279 and the transportation speed of the recording sheet S. The predetermined period of time is stored in the ROM 202.

The CPU 201 refers to the management table stored in the RAM 107 and compares the copy mode performed for the $n^{th}$ recording sheet S with the copy mode to be performed for the $(n+1)^{th}$ recording sheet. If the copy modes are different, the CPU 201 sets a copy mode switching flag in the RAM 107 in accordance with the current copy mode and changes a sheet waiting time T.

More specifically, when the current copy mode is switched from the color copy mode to the monochrome copy mode ("Y" in step S33 and "N" in step S34), the CPU 201 sets the copy mode switching flag at "1" (step S35) as well as setting the sheet waiting time T of the synchronizing roller 279 at t1 (step S36).

Meanwhile, when the current copy mode is switched from the monochrome copy mode to the color copy mode ("N" in step S33 and "Y" in step S37), the CPU 201 sets the copy mode switching flag at "2" (step S38) as well as setting the sheet waiting time T of the synchronizing roller 279 at t2 (step S39).

When the CPU 201 judges "Y" in step S34 or "N" in step S37, this means that the current copy mode does not need to be switched. Thus, the CPU 201 does not set the copy mode switching flag and sets the sheet waiting time T at t3 (step S40).

Then, the CPU 201 starts an internal timer (step S41). After counting the sheet waiting time T by the internal timer (step S42), the CPU 201 checks that the timing sensor SE2 is ON, that is, the $(n+1)^{th}$ recording sheet has reached the synchronizing roller 279, before resetting the internal timer. Simultaneously, the CPU 201 turns on the timing clutch 282 and transports the $(n+1)^{th}$ recording sheet S to the transport belt 281 (steps S43, S44, and S45).

When the internal timer has not finished counting the sheet waiting time T in step S42, the CPU 201 returns to the main routine and waits for the internal timer to finish. Also, when the timing sensor SE2 is not turned on in step S43 due to an error, such as a paper jam, the CPU 201 returns to the main routine.

As described above, the control unit 200 controls the distance between the recording sheets transported to the transfer unit 820, according to the sheet waiting time T set as t1, t2, or t3 depending on whether the copy mode which is operational is to be switched. These sheet waiting times t1 to t3, t1 and t2 in particular, are determined so that the image formation is not adversely affected by the shift operation of the shift unit 821 performed when the copy mode is switched. The specific conditions to determine those times are described later in this specification.

The CPU 201 next refers to the management table to judge whether there is a next document (step S46). If there is, the CPU 201 increments a variable "n" by "1" and returns to the main routine (step S47). If not, the CPU 201 checks the detection of the off-edge regarding the $(n+1)^{th}$ recording sheet S from the timing sensor SE2 before turning off the timing clutch 282 to stop the rotation of the synchronizing roller 279 after the predetermined period of time elapsed (steps S48 and S49). Then, the CPU 201 returns to the main routine.

FIG. 20 is the flowchart showing a subroutine for shift switch control of the shift unit 821 performed by the CPU 201.

The CPU 201 judges whether a black toner image formed on the photosensitive drum 611K has been transferred onto the $n^{th}$ recording sheet S (step S51). The CPU 201 can make this judgement by counting time since the synchronizing roller 279 started transporting the $n^{th}$ recording sheet S. More specifically, the CPU 201 calculates time taken for the recording sheet S to pass by the photosensitive drum 611K by dividing the addition of the distance from the synchronizing roller 279 to the transfer position of the photosensitive drum 611K and the longitudinal length of the recording sheet S by the transportation speed of the recording sheet S. After this calculated time elapses, the CPU 201 may judge that the recording sheet S has passed the transfer position of the photosensitive drum 611K. Alternatively, a photoelectric sensor may be provided after the transfer position of the photosensitive drum 611K in the transportation direction. When the photoelectric sensor detects the off-edge of the recording sheet, the CPU 201 may judge that the black toner image has been transferred onto the recording sheet.

When judging that the black toner image has been transferred onto the nth recording sheet S, the CPU 201 checks the value of the copy mode switching flag in the RAM 107 (step S52). If the value is other than "0", this means that the current copy mode needs to be switched. The CPU 201 then judges whether the copy mode switching flag is set at "1" in step S53.

If so ("Y" in step S53), the CPU 201 has the shift unit 821 move downward so that a state where the transport belt 281 is pressed against the photosensitive drums 611C to 611Y (referred to as the "contacting state" hereinafter) changes to a state where the transport belt 281 is moved away from the photosensitive drums 611C to 611Y (referred to as the "separated state" hereinafter) (step S54). Here, the rotation of the photosensitive drums 611C to 611Y is stopped, thereby preventing needless wear and tear on the components.

Meanwhile, if the copy mode switching flag is set at "2" ("N" in step S53), the CPU 201 has the shift unit 821 returned to the horizontal position so that the separated state changes to the contacting state (step S55). Simultaneously, the photosensitive drums 611C to 611Y are rotated.

After executing this shift switch operation, the CPU 201 resets the copy mode switching flag to "0" (step S56).

In this way, the CPU 201 determines the copy mode for each recording sheet S supplied to the image processing system 600 and executes the shift switch operation of the shift unit 821. The shift switch operation is performed immediately after the black toner image formed on the photosensitive drum 611K is transferred onto the $n^{th}$ recording sheet S, so that the image formation onto the $n^{th}$ recording sheet S is not adversely affected by the shift switch operation.

However, the shift switch operation needs to be complete before the toner image is transferred onto the $(n+1)^{th}$ recording sheet S. Otherwise, the image transfer onto the $(n+1)^{th}$ recording sheet S is unstable, and as a result, color displacements may occur and the toner image may be transferred onto the $(n+1)^{th}$ recording sheet S at an incorrect position. To avoid these problems, the values of the sheet waiting time t1 and t2 are properly set.

Figure 21:
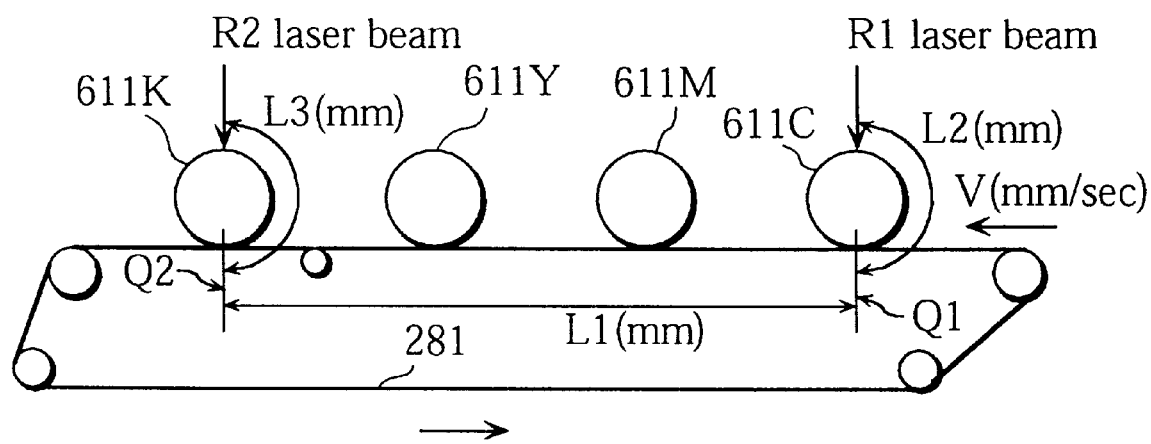
FIG. 21 is a schematic view showing the exposure positions and transfer positions of the photosensitive drums of the full-color copying machine of the third embodiment.

The following is a description of the specific conditions to determine the values of t1 and t2, with reference to FIG. 21 to FIG. 23.

FIG. 21 is a schematic view of the image processing system 600. The transportation speed of the recording sheet transported by the transport belt 281 is referred to as V(mm/sec). The distance between a transfer position Q1 of the photosensitive drum 611C and a transfer position Q2 of the photosensitive drum 611K is referred to as L1(mm). The length along the circumference of the photosensitive drum 611C from a scanning start position R1 by the laser beam and the transfer position Q1 as indicated by an arrow is referred to as L2(mm). The length along the circumference of the photosensitive drum 611K from a scanning start position R2 by the laser beam and the transfer position Q2 as indicated by an arrow is referred to as L3(mm). Also, the time taken for the shift unit 821 to shift from the contacting state to the separated state and from the separated state to the contacting state is referred to as t(second). It should be noted here that the same components are used for the image forming units 661C to 611K in the present embodiment so that manufacturing costs can be reduced and maintenance can be simplified. Thus, the lengths L2 and L3 are equal in the present embodiment. However, the values of L2 and L3 may be different due to a different design configuration.

Figure 22A:
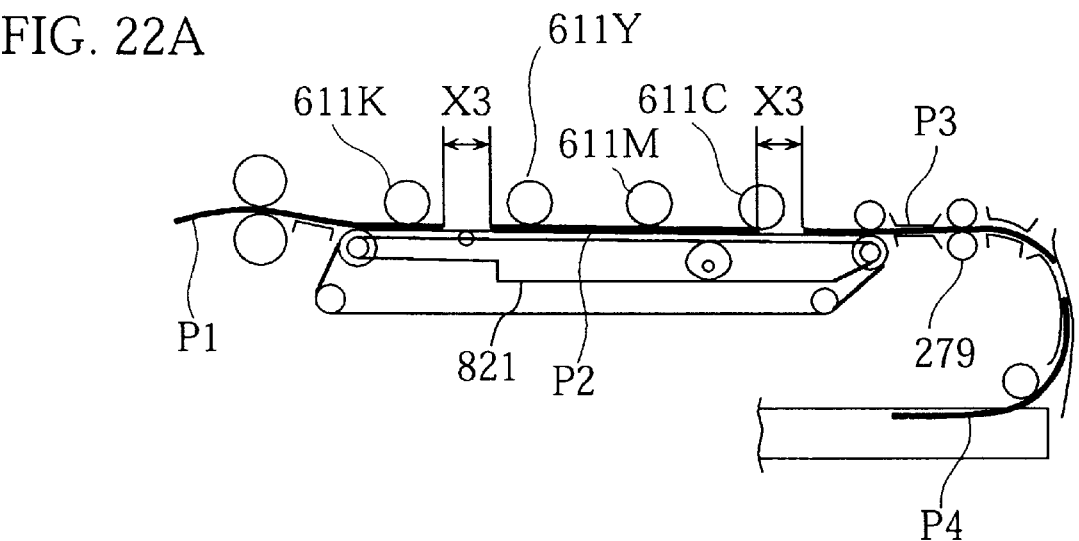
FIGS. 22A to 22C show that the distance between the recording sheets changes when the current copy mode is switched from the color copy mode to the monochrome mode during the successive copy operations controlled by the control unit of the third embodiment.
Figure 22B:
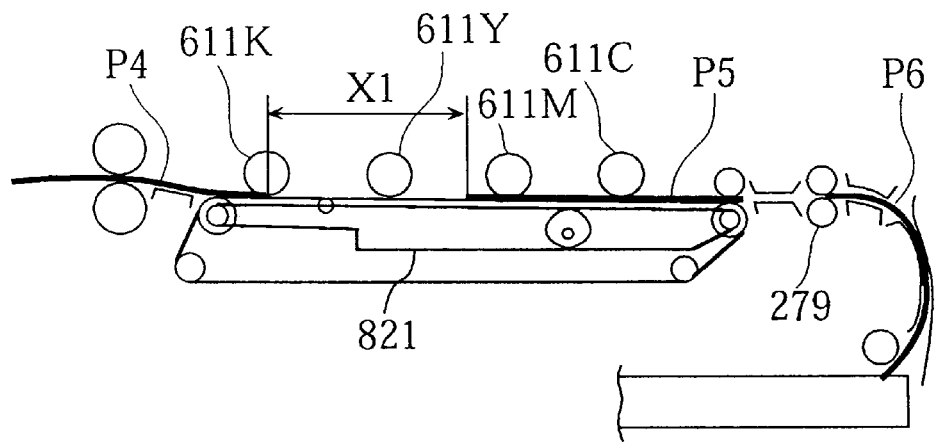
Figure 22C:
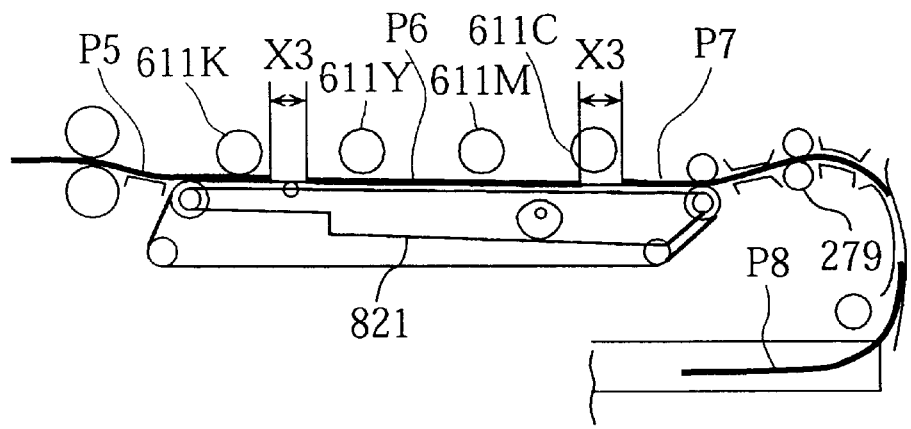

The following is a description of distance control performed when the current copy mode is changed from the color copy mode to the monochrome copy mode during the successive copy operations, with reference to FIGS. 22A to 22C.

In FIGS. 22A to 22C, the thick lines P1 to P8 are recording sheets. As one example, the recording sheet P3 is the third recording sheet to be supplied in the successive copy operations.

When copy operations are successively performed in the color copy mode, the distance between the recording sheets are set at X3 as shown in FIG. 22A. The distance X3 is determined to make the copy processing speed fastest in consideration of a scanning speed of the image read unit 220 and a heating value of the fixing unit 264. The sheet waiting time T of the synchronizing roller 279 required for leaving the distance X3 is set at t3.

If the monochrome copy mode is to be performed for the recording sheet P5 according to the management table, the separating operation of the shift unit 821 needs to be complete before the scanning is started on the surface of the photosensitive drum 611K. For this reason, the distance between the recording sheets P4 and P5 is set at X1 that is longer than X3 in the transportation direction as shown in FIG. 22B.

The distance X1 needs to be determined to have the leading edge of the recording sheet P5 reach a point that is positioned at least L3(mm) before the transfer position Q2 of the photosensitive drum 611K, on completion of the shift operation of the shift unit 821 from the contacting state to the separated state.

In addition, if the shift operation starts immediately after the recording sheet P4 passes the transfer position Q2 of the photosensitive drum 611K, the distance that the recording sheet P5 is transported during the time t measured until completion of the shift operation is V·t. This is to say, the distance X1 needs to be at least the length L3+V·t. Thus, Equation 1 give the condition which the distance X1 needs to satisfy.

$$X1 \geq L3+V \cdot t \quad \text{(Equation 1)}$$

The sheet waiting time of the synchronizing roller 279 that satisfies the condition for the distance X1 is obtained and set at t1.

When the shift operation of the shift unit 821 is complete, the CPU 201 stops the rotation of the photosensitive drums 611C to 611Y which are not used for forming the image in the monochrome mode, thereby preventing wear and tear on components such as the cleaners 614C to 614Y.

If the following copy operations are also to be performed in the monochrome copy mode, the distance between the recording sheets is set at X3 and the successive copy operations are performed as shown in FIG. 22C.

In this way, when the color copy mode is switched to the monochrome copy mode, the distance between the recording sheets is set at X1 or greater so that the mechanical vibrations caused by the shifting of the shift unit 821 have no effect on the copying operation. By doing so, the image quality can be properly maintained and decreases in the speed of copy operations can be suppressed.

Figure 23A:
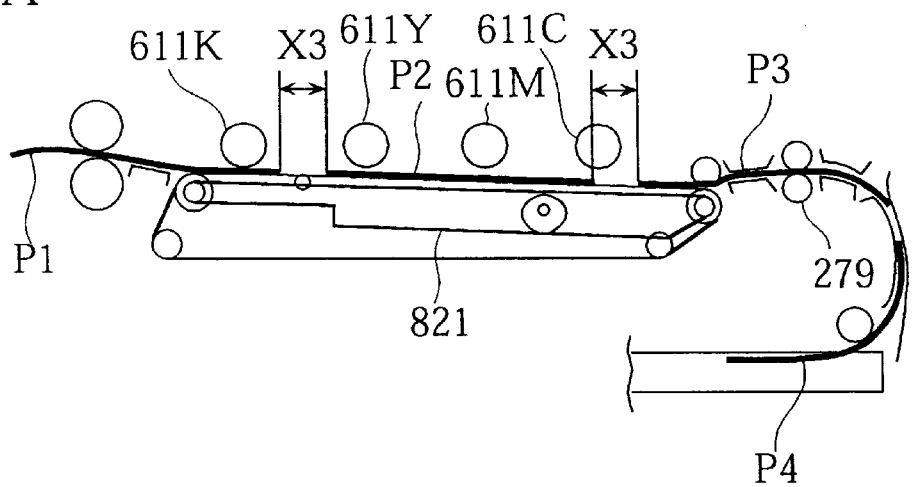
FIGS. 23A to 23C show that the distance between the recording sheets changes when the current copy mode is switched from the monochrome copy mode to the color copy mode during the successive copy operations controlled by the control unit of the third embodiment.
Figure 23B:
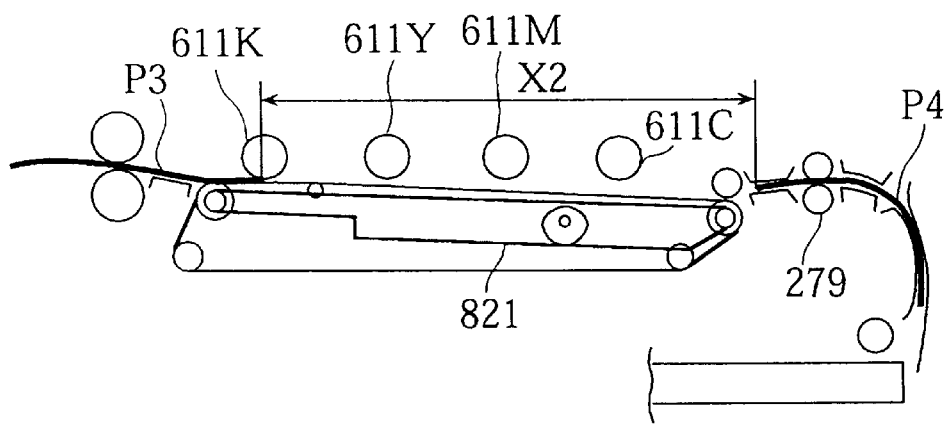
Figure 23C:
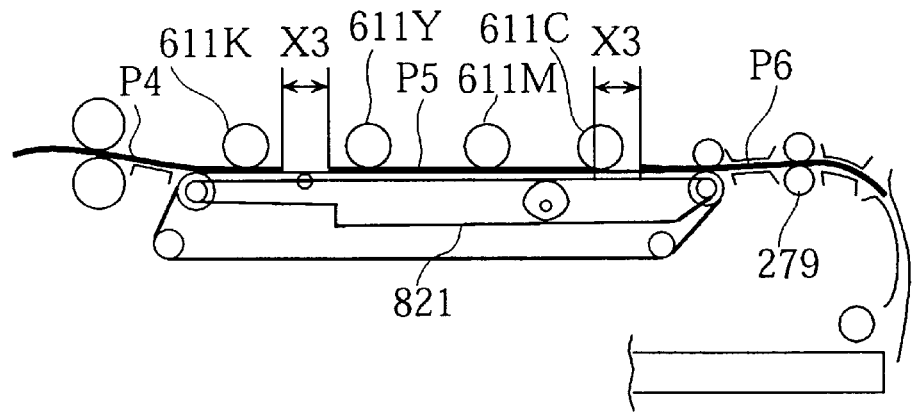

Next, the following is a description of distance control performed when the current copy mode is changed from the monochrome copy mode to the color copy mode during successive copy operations, with reference to FIGS. 23A to 23C.

As in the case of successive copy operations in the color copy mode, the distance between the recording sheets is set at X3 as shown in FIG. 23A when copy operations are successively performed in the monochrome copy mode.

If the color copy mode is to be performed for the recording sheet P4 according to the management table, the contacting operation of the shift unit 821 needs to be complete before the scanning is started on the surface of the photosensitive drum 611C. For this reason, the distance between the recording sheets P3 and P4 is set at X2 that is longer than X1 in the transportation direction as shown in FIG. 23B.

The distance X2 needs to be determined to have the leading edge of the recording sheet P4 reach a point that is positioned at least L2(mm) before the transfer position Q1 of the photosensitive drum 611C, on the completion of the shift operation of the shift unit 821 from the separated state to the contacting state.

In addition, if the shift operation starts immediately after the recording sheet P3 passes by the transfer position Q2 of the photosensitive drum 611K, the distance that the recording sheet P4 is transported during the time t measured until the completion of the shift operation is V·t. This is to say, the distance X2 needs at least the length L1+L2+V·t. Thus, Equation 2 gives the condition which the distance X2 needs to satisfy.

$$X2 \geq L1+L2+V \cdot t \quad \text{(Equation 2)}$$

Meanwhile, the sheet waiting time of the synchronizing roller 279 that satisfies the condition for the distance X2 is obtained and set at t2.

If the following copy operations are also to be performed in the color copy mode, the distance between the recording sheets is set at X3 and the successive copy operations are performed as shown in FIG. 23C.

The CPU 201 controls the shift operation of the shift unit 821 from the separated state to the contacting state as well as controlling the photosensitive drums 611C to 611Y to rotate for the color copy operation.

It should be noted here that the distance X3, which is set when the successive copy operations are performed in the same copy mode, may be set as a different value for each copy mode.

In this way, when the monochrome copy mode is switched to the color copy mode, the distance between the recording sheets is set at X2 or greater so that the mechanical vibrations caused by the shifting of the shift unit 821 have no effect on the copying operation. By doing so, the image quality can be properly maintained and decreases in the speed of copy operations can be suppressed.

Note that the transport belt 281 is rotated at a constant speed even during the shift operation of the shift unit 821, so that the copy processing speed is not reduced.

Modifications

The present invention has been described in accordance with the first to third embodiments. It should be obvious that the present invention is not limited to these embodiments, so that the following modifications can be made.

(1) Although the transfer unit 820 is shifted downward in the monochrome copy mode so that the recording sheet is separated from the photosensitive drums 611C to 611Y which are not used for forming the image in the third embodiment, the method for separating the photosensitive drums 611C to 611Y and the recording sheet is not limited to this. For example, the photosensitive drums 611C to 611Y may be shifted upward to separate them from the recording sheet.

(2) The photosensitive drum 611K used in the monochrome copy mode is set at the rearmost position in the third embodiment. However, the position is not limited to this and the photosensitive drum 611K may be set at the frontmost position. In this case, the shift unit 821 may be held to rotate about the axis of the drive roller 822 and may be shifted upward or downward together with the rotation of the cam plates 832. It should be obvious that the arrangements of the components, such as the cam plates 832, the spring 827, and the auxiliary roller 823, needs to be changed in accordance with this rearrangement.

With this construction, when the color copy mode is switched to the monochrome copy mode, the shift unit 821 needs to be shifted downward after the recording sheet passes by the transfer position of the photosensitive drum located at the rearmost position. Only after the shift operation of the shift unit 821 is complete, the scanning is started on the surface of the photosensitive drum 611K located at the frontmost position. Thus, the distance X1 needs to be set according to an equation that is the same as Equation 2, i.e., $$X1 \geq L1 + L2 + V \cdot t.$$

(3) When the current copy mode is switched in the third embodiment, the distances X1 and X2 are determined so that the shift operation of the shift unit 821 is completed before the scanning is started on the surface of the photosensitive drum on which the toner image is to be formed first. Here, this photosensitive drum is the photosensitive drum 611C when the copy mode is switched to the color copy mode, and is the photosensitive drum 611K when the copy mode is switched to the monochrome copy mode. As a result, the mechanical vibrations caused by the shift operation of the shift unit 821 gives no adverse effect to the scanning on the photosensitive drum.

However, the mechanical vibrations caused by the shift operation of the shift unit 821 have their greatest effect when the toner image is transferred onto the recording sheet. As such, when the copy processing speed takes top priority, the distances X1 and X2 need to be determined so that the shift operation of the shift unit 821 is completed before the leading edge of the recording sheet reaches the transfer position of the photosensitive drum on which the toner image is formed first.

In this case, Equations 1 and 2 are respectively changed to the following equations.

$$X1 \geq V \cdot t \quad \text{(Equation 3)}$$

$$X2 \geq L1 + V \cdot t \quad \text{(Equation 4)}$$

Although upper limit values of the distances X1 and X2 are not determined by Equations 1 to 4, it should be obvious that the copy processing speed is improved when the value is set as close to the lower limit as possible.

There is a risk that the mechanical vibrations remain even after the shift operation of the shift unit 821 is complete. In this case, the distances X1 and X2 may be set longer than the lower limit in the transportation direction, in consideration of the time required until the mechanical vibrations have no adverse effect to the image formation. As a result, deterioration on the transferred image incurred when the copy mode is switched can be prevented more reliably.

In particular, it is desirable to set the distance X1 equal to or less than L1. If the distance X1 is set higher than L1, the shift operation of the shift unit 821 is executed in a state where no photosensitive drum is in contact with any recording sheet. In this case, the shift operation hardly affects the image formation. However, if the distance X1 is set further exceeding L1, it only causes a decrease in the copy processing speed, which is not desirable.

(4) In the third embodiment, the CPU 201 judges the copy mode to be performed for each recording sheet by checking color information of each document page recorded in the management table when the recoding sheet is supplied by the synchronizing roller 279. However, when a plurality of copies (or, multi-copy) is made from one document, the CPU 201 may judge the copy mode only for the first recording sheet out of the plurality of copies in accordance with the color information of the document.

In this case, the CPU 201 does not need to judge the copy mode for the second recording sheet onwards, so that the distance between the recording sheets can be set shorter than the distance X3, thereby improving the copy processing speed.

(5) Although a tandem-type full-color copier is described as the present invention in the first to third embodiments, the present invention is not limited to this. For example, a tandem-type full-color image forming apparatus, such as a laser printer and a facsimile, can be used.

Although the present invention has been fully described by way of examples with reference to the accompanying drawings, it is to be noted that various changes and modifications will be apparent to those skilled in the art.

Therefore, unless such changes and modifications depart from the scope of the present invention, they should be constructed as being included therein.

What is claimed is:

1. An image forming apparatus comprising:
a transporting unit for transporting a recording sheet;
a first image forming assembly set on a transportation path of the recording sheet, including a first image holding component and an exposure unit for exposing the image holding component;
a second image forming assembly set on the transportation path of the recording sheet, including at least one second image holding component;
a separating unit for separating a recording sheet supporting surface of the transporting unit and each second image holding component of the second image forming assembly; and
an exposure timing changing unit for changing an exposure start timing for the exposure unit of the first image forming assembly when the transporting unit is separated by the separating unit.

2. The image forming apparatus of claim 1, wherein the transporting unit includes an endless belt and a driving device for driving the endless belt.

3. The image forming apparatus of claim 2, wherein each image holding component of the first image forming assembly and the second image forming assembly is drum-shaped, with rotational axes of the image holding components being set parallel in a same plane.

4. The image forming apparatus of claim 3, wherein the first image holding component forms a black image.

5. The image forming apparatus of claim 4, wherein the second image forming assembly includes a plurality of image holding components, each image holding component forming an image for a color other than black.

6. The image forming apparatus of claim 5, wherein the first image forming assembly is set at a downstream side of the second image forming assembly in the transportation direction of the recording sheet.

7. The image forming apparatus of claim 6, wherein the separating unit includes a supporting shaft and a shifting unit, the supporting shaft being provided on an inside of the endless belt at a position between the first image forming assembly and the second image forming assembly, and the shifting unit rotating an upstream side of the recording sheet supporting surface of the endless belt from the supporting shaft about the supporting shaft.

8. The image forming apparatus of claim 1 further comprising:
   a recording sheet supplying unit for supplying the recording sheet from a standard position to the transporting unit when the transporting unit is in contact with each second image holding component and when the transporting unit is not in contact with each second image holding component,
   wherein the exposure timing changing unit changes the exposure start timing in accordance with a difference of transportation path lengths between when a separating operation has been performed and has not been performed, with the transportation path length being measured from the standard position to a position where an image formed on the first image holding component is transferred onto the recording sheet.

9. The image forming apparatus of claim 1 further comprising:
   a recording sheet supplying unit for supplying the recording sheet from a standard position to the transporting unit when the transporting unit is in contact with each second image holding component and when the transporting unit is not in contact with each second image holding component; and
   a time difference detecting unit for detecting a time difference between time periods taken for the recording sheet to reach a transfer position of the first image holding component from the standard position when a separating operation has been performed and has not been performed, with the transfer position being a position where an image formed on the first image holding component is transferred onto the recording sheet,
   wherein the exposure timing changing unit changes the exposure start timing in accordance with the time difference.

10. The image forming apparatus of claim 1 further comprising:
    a color information obtaining unit for obtaining color information of an image to be formed onto the recording sheet,
    wherein the separating unit operates in accordance with the obtained color information.

11. An image forming apparatus comprising:
    a transport belt for transporting a recording medium;
    a plurality of image forming units set along a transportation path of the recording medium, each including an image holding component and an exposure unit for exposing the image holding component;
    an image formation mode switching unit for switching between a color mode where an image is formed using the plurality of image forming units and a monochrome mode where an image is formed using only one of the plurality of image forming units;
    a transport belt separating unit for separating a recording medium supporting surface of the transport belt and the image holding components of the image forming units aside from the image forming unit used in the monochrome mode; and
    an exposure control unit for using an exposure start timing for the exposure unit of the image forming unit used in the monochrome, the exposure start timing being different for the color mode and the monochrome mode.

12. The image forming apparatus of claim 11, wherein each image holding component of the plurality of image forming units is drum-shaped, with rotational axes of the image holding components being set parallel in a same plane.

13. The image forming apparatus of claim 12, wherein the image forming unit used in the monochrome mode is set further downstream than other image forming units in a transportation direction of the recording medium.

14. The image forming apparatus of claim 11 further comprising:
    a recording medium supplying unit for supplying the recording medium from a standard position to the transport belt when the transport belt is in contact with the image forming units that are not used in the monochrome mode and when the transport belt is not in contact with the image forming units that are not used in the monochrome mode,
    wherein the exposure control unit changes the exposure start timing in accordance with a difference between transportation path lengths in the color mode and the monochrome mode, with the transportation path length being measured from the standard position to a position where an image formed on the image holding component used in the monochrome mode is transferred onto the recording medium.

15. The image forming apparatus of claim 11 further comprising:
    a recording medium supplying unit for supplying the recording medium from a standard position to the transport belt when the transport belt is in contact with the image forming units that are not used in the monochrome mode and when the transport belt is not in contact with the image forming units that are not used in the monochrome mode; and
    a time difference detecting unit for detecting a time difference between time periods in the color mode and monochrome mode taken for the recording medium to reach a transfer position of the image holding component of the image forming unit used in the monochrome mode from the standard position, with the transfer position being a position where an image formed on the image holding component of the image forming unit used in the monochrome mode is transferred onto the recording medium,
    wherein the exposure control unit changes the exposure start timing in accordance with the timing difference.

16. The image forming apparatus of claim 11 further comprising:
   a color information obtaining unit for obtaining color information of an image to be formed onto the recording medium,
   wherein the image formation mode switching unit selects the image formation mode to be performed between the color mode and the monochrome mode in accordance with the obtained color information.

17. An image forming apparatus comprising:
   a transport belt for transporting a recording sheet;
   a plurality of image forming units set along a transportation path of the recording sheet, each including an image holding component;
   an image formation mode switching unit for switching an image formation mode to be used for the transported recording sheet between a color mode where a color image is formed using the plurality of image forming units and a monochrome mode where a monochrome image is formed using only one of the plurality of image forming units;
   a transport belt shifting unit for shifting the transport belt from a first state to a second state when the image formation mode is changed from color mode to the monochrome mode, and from the second state to the first state when the image formation mode is changed from the monochrome mode to the color mode, the first state being where a recording sheet supporting surface of the transport belt touches the image holding components of the plurality of image forming units used in the color mode and the second state being where the recording sheet supporting surface of the transport belt touches the image holding component of the image forming unit used in the monochrome mode; and
   a control unit for controlling a shift of the transport belt by the transport belt shifting unit to be completed between and end of an image forming operation for the first recording sheet and a start of an image forming operation for a second recording sheet, when the image formation mode for the first recording sheet is different from the image formation mode for the second recording sheet, the second recording sheet being transported after the first recording sheet, wherein the control unit controls a transportation distance between the first recording sheet and the second recording sheet when the transport belt is to be shifted.

18. The image forming apparatus of claim 17, wherein the control unit controls the transportation distance according to an equation $X \geq V \star t$ when the image formation mode is changed from the color mode to the monochrome mode, with X indicating the transportation distance, V indicating a transportation speed of the transport belt, and t indicating a time required for a shift of the transport belt from the first state to the second state.

19. The image forming apparatus of claim 18, wherein each of the plurality of image forming units includes an exposure unit for exposing the image holding component, a developing unit for developing a latent image obtained by an exposure into visible image, and a transfer unit for transferring the developed image formed on the image holding component onto the recording sheet transported by the transport belt, and
   wherein the control unit controls the transportation distance X according to an equation $X \geq L3+V \star t$ when the image formation mode is changed from the color mode to the monochrome mode, with L3 indicating a circumferential length from an exposure position by the exposure unit to a transfer position of the image holding component of the image forming unit used in the monochrome mode.

20. The image forming apparatus of claim 17, wherein each of the plurality of image forming units includes a transfer unit for transferring an image formed on the image holding component onto the recording sheet transported by the transport belt,
   wherein the image forming unit used in the monochrome mode is set further downstream than other image forming units in a transportation direction of the recording sheet transported, and
   wherein the control unit controls a transportation distance according to an equation $X \geq L1+V \star t$ when the image formation mode is changed from the monochrome mode to the color mode, with X indicating the transportation distance, L1 indicating a distance between a transfer position of the image holding component of the image forming unit located further upstream than other image forming units in the transportation direction and a transfer position of the image holding component of the image forming unit located further downstream than other image morning units in the transportation direction, V indicating a transportation speed of the transport belt, and t indicating a time required for a shift of the transport belt from the second state to the first state.

21. The image forming apparatus of claim 20,
   wherein each of the plurality of image morning units further includes an exposure unit for exposing the image holding component, and
   wherein the control unit controls the transportation distance X according to an equation $X \geq L1+L2+V \star t$ when the image formation mode is changed from the monochrome mode to the color mode, with L2 indicating a circumferential length from an exposure position by the exposure unit to a transfer position of the image holding component of the image forming unit located further upstream than other image forming units.

22. The image forming apparatus of claim 17 further comprising:
   a color information obtaining unit for obtaining color information of an image to be formed onto the recording sheet,
   wherein the image formation mode switching unit selects the image formation mode to be performed between the color mode and the monochrome mode in accordance with the obtained color information.

23. The image forming apparatus of claim 22, wherein the color information obtaining unit converts image data of a document into chroma data, judges whether the document is color or monochrome in accordance with the chroma data, and obtains a judgement result as color information,
   wherein the image formation mode switching unit selects the color mode as the image formation mode when the document is judged to be color and selects the monochrome mode as the image formation mode when the document is judged to be monochrome.

24. An image forming apparatus comprising:
   a transport belt for transporting a recording medium;
   a first image forming assembly set on a transportation path of the recording medium, including a first image holding component and an exposure unit for exposing the image holding component;

a second image forming assembly set on the transportation path of the recording medium, including at least one second image holding component;

a separating unit for separating the recording medium and each second image holding component of the second image forming assembly; and an exposure timing changing unit for changing an exposure start timing for the exposure unit of the first image forming assembly when the transporting unit is separated by the separating unit.

* * * * *